(12) United States Patent
Worsley

(10) Patent No.: US 9,008,830 B2
(45) Date of Patent: Apr. 14, 2015

(54) INVENTORY SYSTEM WITH CONNECTABLE INVENTORY HOLDERS

(71) Applicant: Amazon Technologies, Inc., Reno, NV (US)

(72) Inventor: Timothy Craig Worsley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 119 days.

(21) Appl. No.: 13/751,838

(22) Filed: Jan. 28, 2013

(65) Prior Publication Data
US 2014/0214196 A1 Jul. 31, 2014

(51) Int. Cl.
G06F 7/00 (2006.01)
B65G 1/10 (2006.01)
G06Q 10/08 (2012.01)
G05D 1/02 (2006.01)

(52) U.S. Cl.
CPC ............... *B65G 1/10* (2013.01); *G06Q 10/087* (2013.01); *G05D 1/0291* (2013.01); *G05D 2201/0216* (2013.01)

(58) Field of Classification Search
USPC ......................................................... 700/217
See application file for complete search history.

(56) References Cited

U.S. PATENT DOCUMENTS

| | | | |
|---|---|---|---|
| 6,522,952 B1 | 2/2003 | Arai et al. | |
| 6,748,292 B2 | 6/2004 | Mountz | |
| 6,895,301 B2 | 5/2005 | Mountz | |
| 6,950,722 B2 | 9/2005 | Mountz | |
| 7,402,018 B2 | 7/2008 | Mountz et al. | |
| 7,826,919 B2 | 11/2010 | D'Andrea et al. | |
| 7,850,413 B2 | 12/2010 | Fontana | |
| 7,873,469 B2 | 1/2011 | D'Andrea et al. | |
| 7,894,932 B2 | 2/2011 | Mountz et al. | |
| 7,894,933 B2 | 2/2011 | Mountz et al. | |
| 7,912,574 B2 | 3/2011 | Wurman et al. | |
| 7,920,962 B2 | 4/2011 | D'Andrea et al. | |
| 8,068,978 B2 | 11/2011 | D'Andrea et al. | |
| 8,170,711 B2 | 5/2012 | D'Andrea et al. | |
| 8,220,710 B2 | 7/2012 | Hoffman et al. | |

(Continued)

FOREIGN PATENT DOCUMENTS

EP 2062837 A1 5/2009 ................ B66F 9/06

OTHER PUBLICATIONS

Timothy Craig Worsley, "Inventory System with Connectable Inventory Holders," patent application, 080663.0256 (P7972), 76 pages, Jan. 28, 2013.

(Continued)

*Primary Examiner* — Gene Crawford
*Assistant Examiner* — Kyle Logan
(74) *Attorney, Agent, or Firm* — Baker Botts L.L.P.

(57) ABSTRACT

A system includes a station and a management module. The station includes a queue having a first row and a second row. The management module is operable to instruct a first mobile drive unit to move a first group of connected item holders from the second row to the first row, instruct the first mobile drive unit to move the first group of connected item holders along the station such that one or more items stored by the first group of connected item holders are processed at the station, and after the one or more items from the first group of items are processed, instruct a second mobile drive unit to move a second group of connected item holders from the second row to the first row.

20 Claims, 11 Drawing Sheets

(56) References Cited

U.S. PATENT DOCUMENTS

| | | | |
|---|---|---|---|
| 8,239,291 | B2 | 8/2012 | Hoffman et al. |
| 8,280,546 | B2 | 10/2012 | D'Andrea et al. |
| 8,280,547 | B2 | 10/2012 | D'Andrea et al. |
| 8,311,902 | B2 | 11/2012 | Mountz et al. |
| 8,412,400 | B2 | 4/2013 | D'Andrea et al. |
| 8,444,369 | B2 | 5/2013 | Watt et al. |
| 8,483,869 | B2 | 7/2013 | Wurman et al. |
| 8,538,692 | B2 | 9/2013 | Wurman et al. |
| 8,606,392 | B2 | 12/2013 | Wurman et al. |
| 2008/0167884 | A1 | 7/2008 | Mountz et al. |
| 2011/0153063 | A1 | 6/2011 | Wurman et al. |
| 2012/0143427 | A1 | 6/2012 | Hoffman et al. |
| 2012/0282070 | A1 | 11/2012 | D'Andrea et al. |
| 2013/0054005 | A1 | 2/2013 | Stevens et al. |
| 2013/0103552 | A1 | 4/2013 | Hoffman et al. |
| 2013/0173049 | A1* | 7/2013 | Brunner et al. .............. 700/216 |
| 2013/0302132 | A1 | 11/2013 | D'Andrea |

OTHER PUBLICATIONS

Timothy Craig Worsley, "Inventory System with Connectable Inventory Holders," patent application, 080663.0258 (PM5281), 75 pages, Jan. 28, 2013.

Bay, J; 'Design of the "Army-Ant" Cooperative Lifting Robot': IEEE Robotics and Automation Magazine, Publication [online]. Mar. 1995; URL: http://ieeexplore.ieee.org/xpl!login.jsp?tp=388293 &url=http%3A%2F%2Fieeexplore.ieee.org%2Fiell_%2F1_00%2F8811_%2F00388293.pdf%3Farnumber%3D388293>; pp. 36-43.

Mataric, MJ et al.; 'Cooperative Multi-Robot Box-Pushing': IEEE/RSJ International Conference on Intelligent Robots and Systems, vol. 3; Publication [online]. Aug. 1995; URL: http://ieeexplore.ieee.org/xpl/login.jsp?tp=&arnumber=525940 &url=http%3A%2F%2Fieeexplore.ieee.org%2Fxpls%2Fabs_all.jsp%3Farnumber%3D525940>; pp. 556-561.

PCT Notification of Transmittal of Int'l Search Report and Written Opinion of the Int'l Searching Authority, or the Declaration with the attached Int'l Search Report and Written Opinion of the Int'l Searching Authority; appl PCT/US14/12948 (9 pgs).

Response to Non-Final Office Action; U.S. Appl. No. 13/751,635, Inventor: Worsley et al. (14 pgs.), Nov. 24, 2014.

USPTO Election Restriction, U.S. Appl. No. 13/751,635, Inventor: Worsley et al. (4 pgs), Jun. 20, 2014.

USPTO Formalities Letter re: Notice to File Corrected Application Papers (2 pgs.), Mar. 5, 2013.

Response to Notice to File Corrected Application Papers; U.S. Appl. No. 13/751,635, Inventor: Worsley et al. (116 pgs.), Mar. 7, 2013.

Response to Election Restriction; U.S. Appl. No. 13/751,635, Inventor: Worsley et al. (9 pgs.), Jul. 25, 2014.

USPTO Non-Final Office Action; U.S. Appl. No. 13/751,635, Inventor: Worsley et al. (9pgs.), Aug. 29, 2014.

USPTO Formalities Letter re: Notice to File Corrected Application Papers (2 pgs.), Feb. 22, 2013.

Response to Notice to File Corrected Application Papers; U.S. Appl. No. 13/751,993, Inventor: Worsley et al. (116 pgs.), Mar. 7, 2013.

* cited by examiner

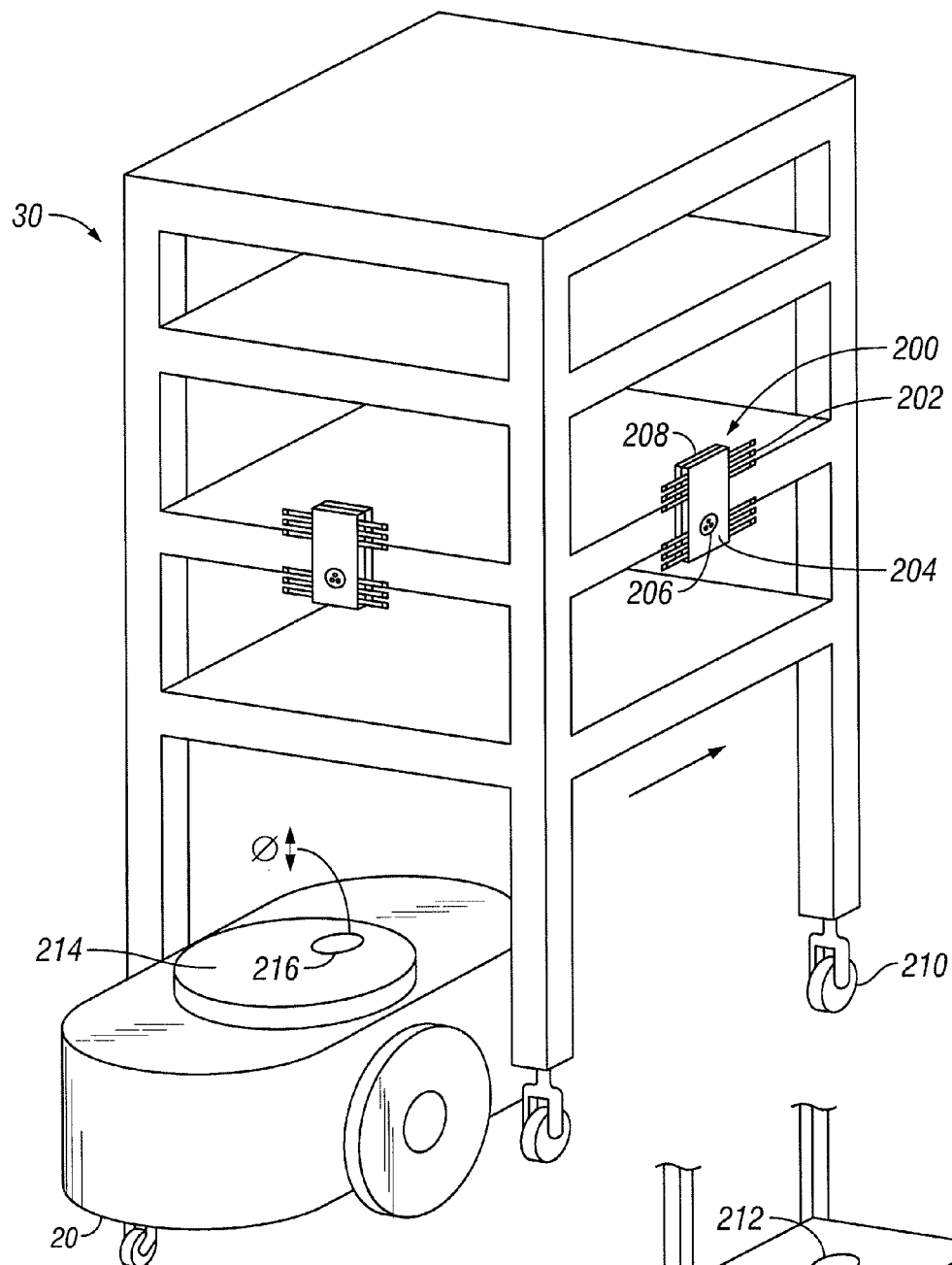
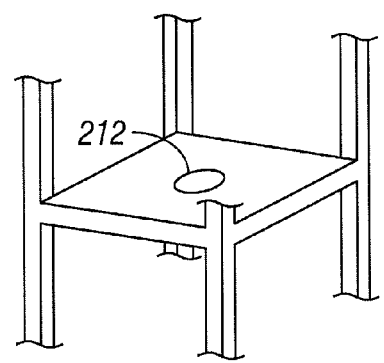
FIG. 2A
FIG. 2B

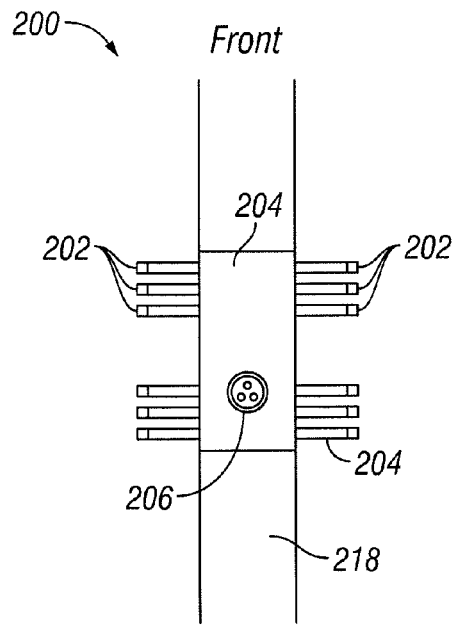
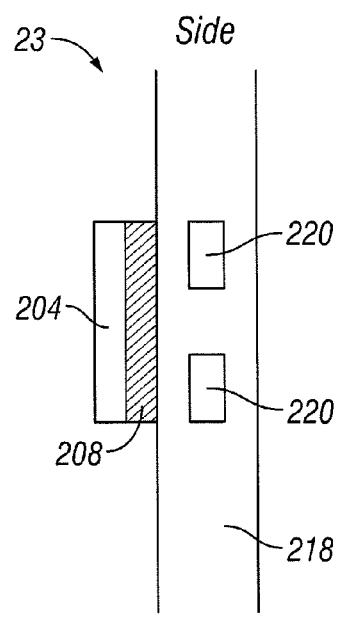
FIG. 3A
FIG. 3B
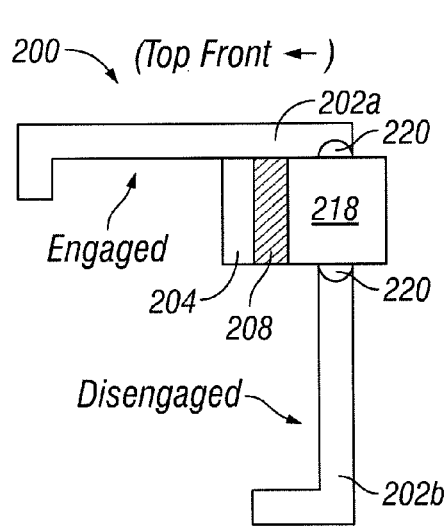
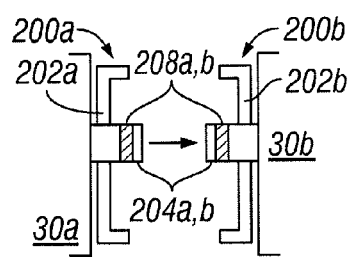
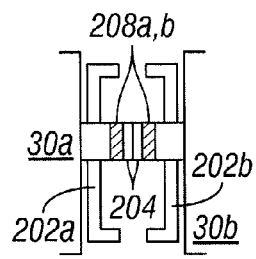
FIG. 3C
FIG. 4A
FIG. 4B
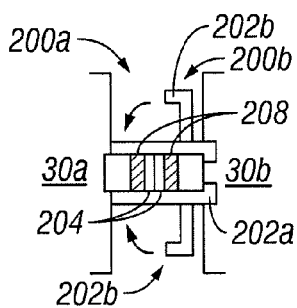
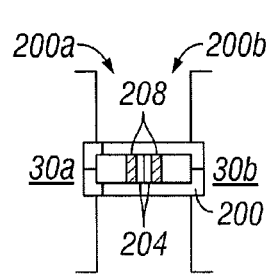
FIG. 4C
FIG. 4D

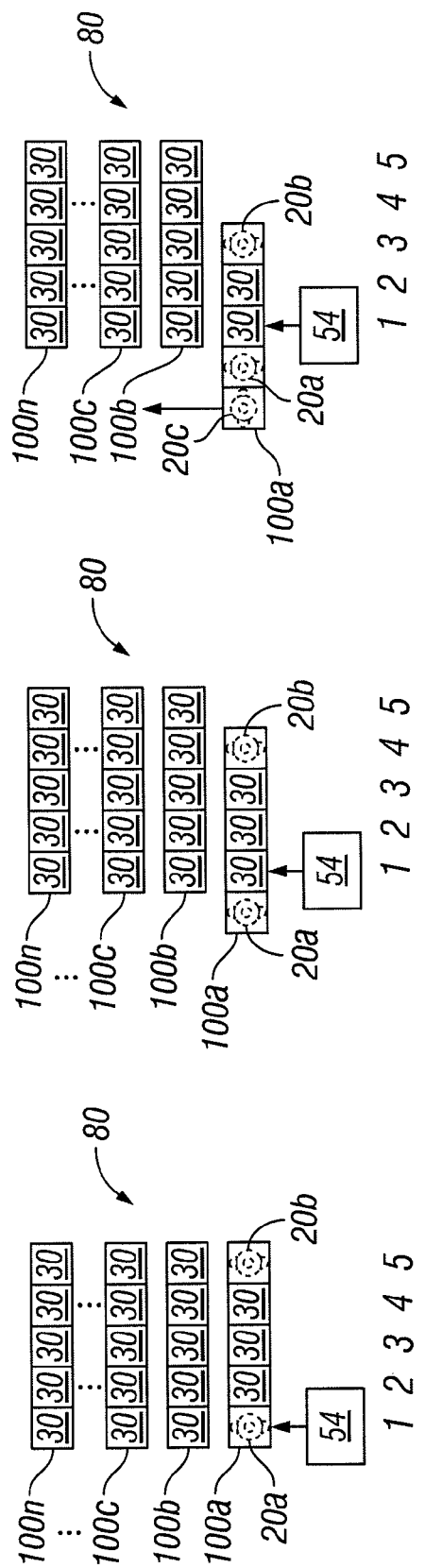

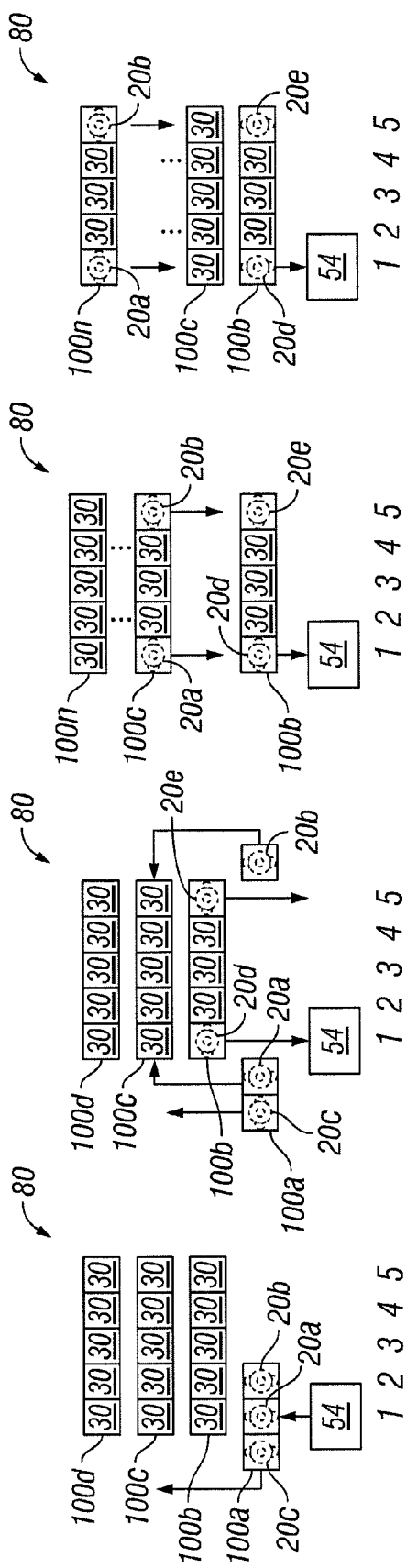

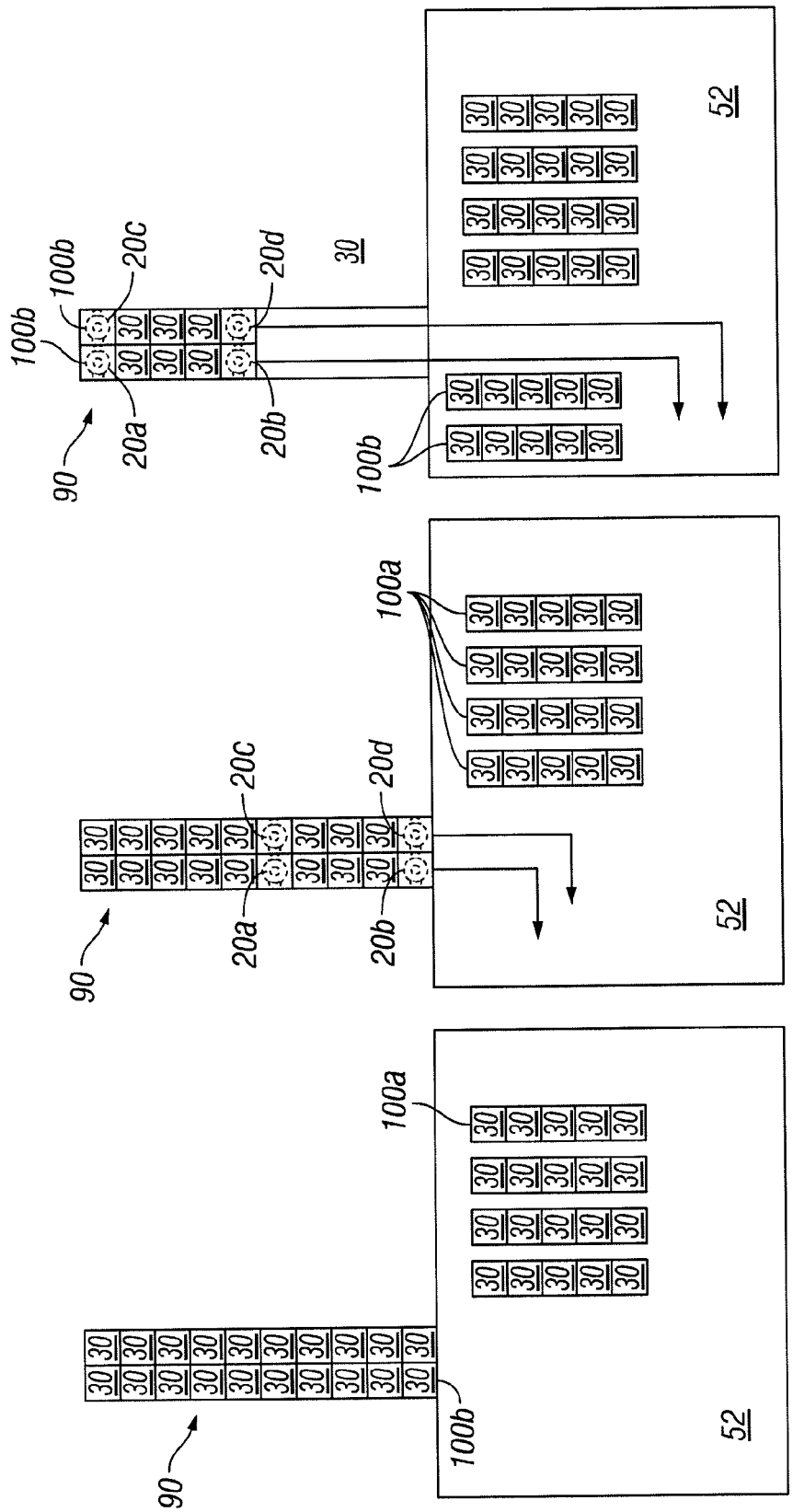

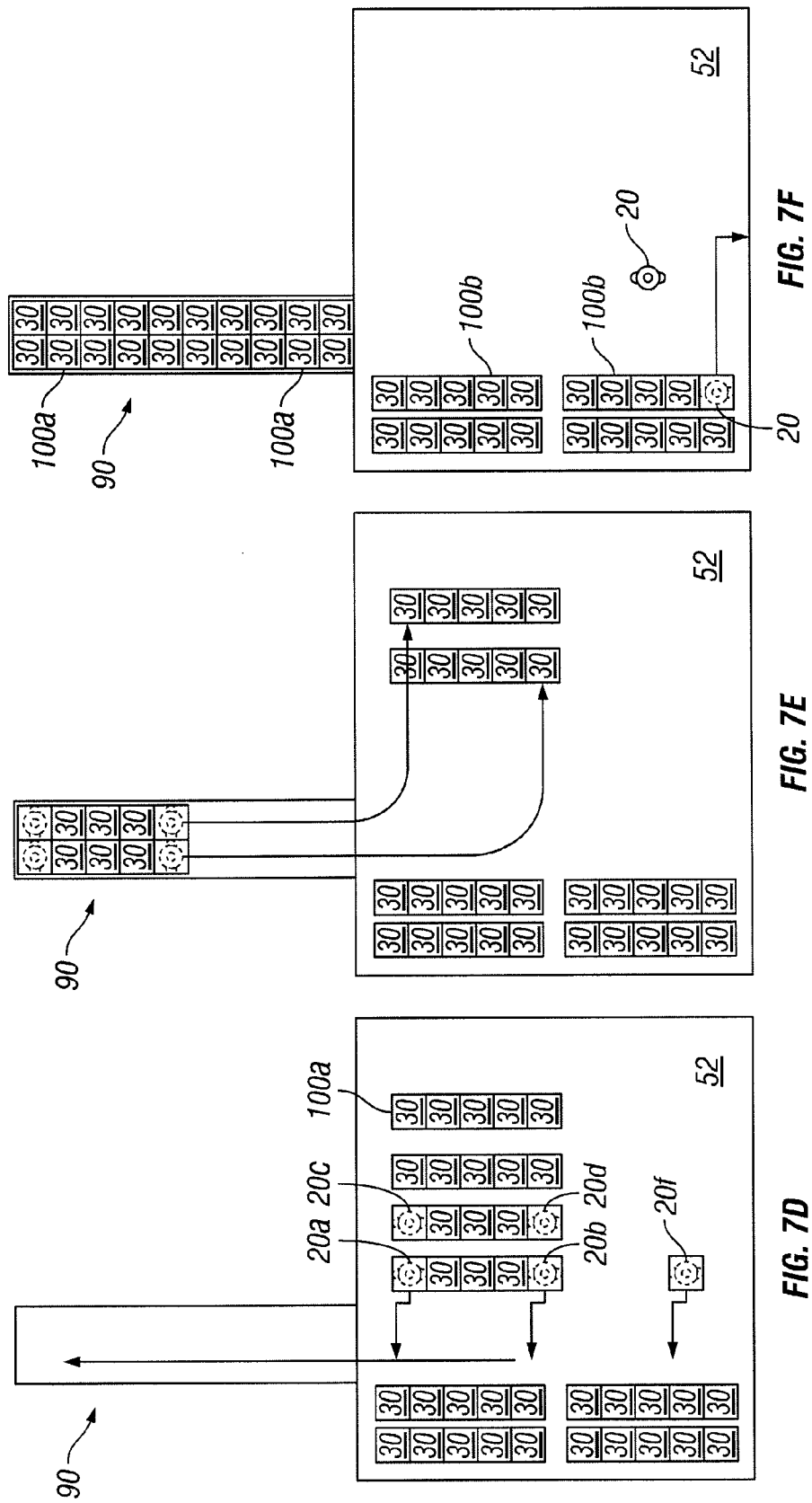

INVENTORY SYSTEM WITH CONNECTABLE INVENTORY HOLDERS

BACKGROUND

Modern inventory systems, such as those in distribution warehouses, e-commerce warehouses, and custom-order manufacturing facilities, face significant challenges in responding to requests for inventory items. In particular, inventory systems face challenges in making efficient use of time, space, resources in the face of growing demand and tighter shipping schedules. Those challenges are exacerbated by ever increasing size and throughput requirements of many modern inventories. As a result, the ability to efficiently utilize available equipment and resources while maintaining efficiencies in terms of time and space can be crucial to the success of such inventory systems.

BRIEF DESCRIPTION OF THE DRAWINGS

For a more complete understanding of the present invention and its advantages, reference is now made to the following description, taken in conjunction with the accompanying drawings, in which:

FIGS. 2A and 2B are perspective drawings of an example inventory holder and mobile drive unit;

FIGS. 3A-3C are views of an example connection mechanism of an inventory holder;

FIGS. 4A-4D are views illustrating an example method of connection using a connection module for an inventory holder;

FIGS. 6A-6G are block diagrams illustrating an example method of operating an inventory station using connected inventory holders;

FIGS. 7A-7F are block diagrams illustrating an example method of operating a shipping station using connected inventory holders;

DESCRIPTION OF EXAMPLE EMBODIMENTS

Figure 1:
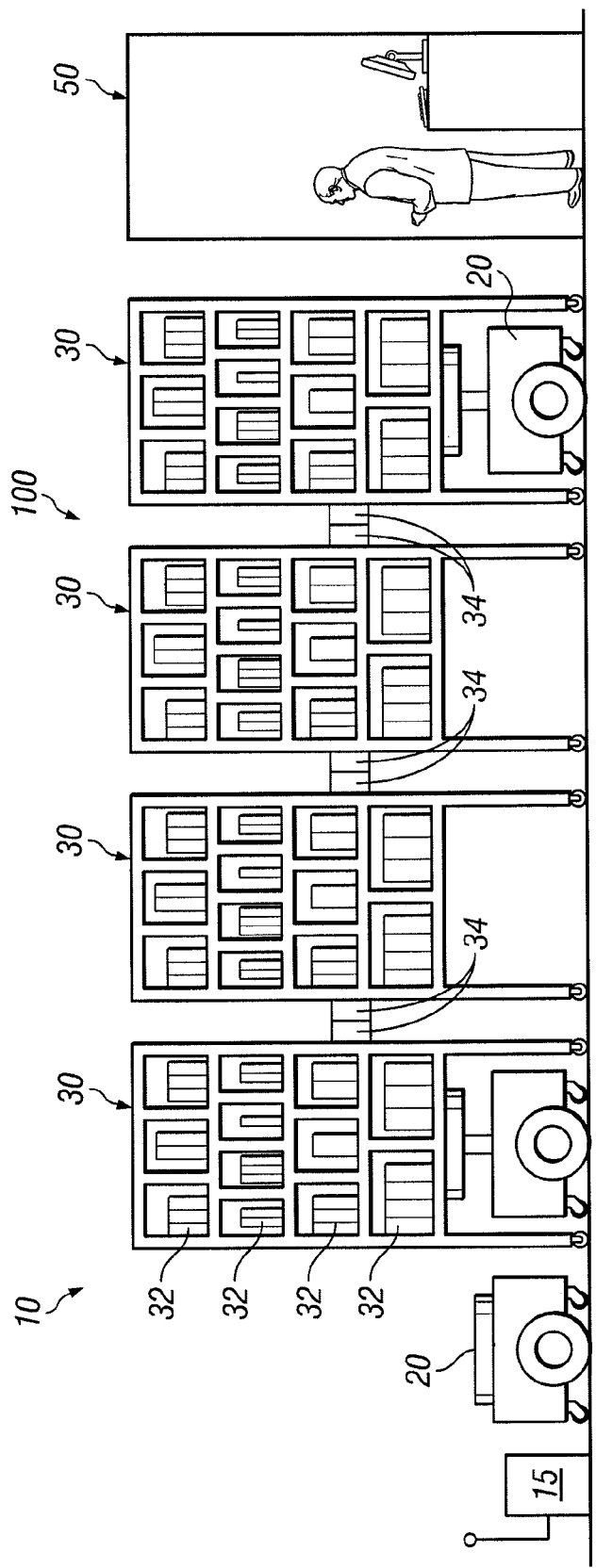
FIG. 1 is an illustration of an example embodiment of an inventory system.

Inventory systems are utilized by many entities for storing and managing inventory. For example, some retailers may utilize a warehouse of racks that store inventory items in various bins. When an order for a specific inventory item needs to be filled by the retailer, a worker typically retrieves the inventory item from the bin where the inventory item is stored.

Inventory systems of the present disclosure may utilize one or more mobile drive units to automatically retrieve inventory holders from warehouse storage. The inventory holders may be entire racks of shelves, with each shelf having bins for various inventory items. Mobile drive units may be self-powered robotic devices configured to move freely about the warehouse. Racks may be transported by mobile drive units to a station for performing inventory operations. The station may include a human operator and/or automated equipment to remove desired inventory items from the inventory holders and complete orders. The ability for mobile drive units to transport inventory items to a station for performing inventory operations rather than or in addition to workers manually retrieving inventory items from stationary racks may vastly increase efficiency and productivity of the inventory system. For example, by utilizing mobile drive units, an inventory system may be capable of fulfilling more orders per hour than previous solutions. Mobile drive units may move about the warehouse and/or retrieve inventory holders in response to commands and/or instructions received from an automated guidance system. For example, a management module may control administration and coordination of certain elements and/or tasks within the warehouse. The management module may receive orders for inventory items in the warehouse and coordinate task assignments for fulfilling the orders, including providing instructions to mobile drive units to transport racks with requested inventory items to an inventory station for completion of an order. The management module may also provide guidance at the inventory station for how the order is to be assembled.

To use a simple illustration, in a distribution warehouse for an office supply store, the management module may receive an order for a printer, several ink cartridges, and a box of paper. The management module may determine the locations of these items within the racks of storage in the distribution warehouse. The items may, for instance, be on the shelves of three separate racks. The management module may issue tasks for three different mobile drive units to retrieve each rack respectively holding the printer, ink cartridges, and paper, and for the mobile drive units to transport the racks holding those items to an inventory station where the order for the three items may be packed into a box for shipment. In doing so, the management module may coordinate the various tasks such that all of the orders received by the management module are fulfilled in an efficient manner.

To facilitate fulfilling orders at the inventory station in a more efficient manner, inventory holders may be transported to a queue where they may wait their turn to have their items processed. Because a queue may move on a fairly regular basis as items are processed from each inventory holder, a mobile drive unit may typically be used for each inventory holder to ensure that the inventory holders progress through the queue in a timely manner. Depending on the size of the queue, this may potentially keep many mobile drive units tied up waiting in queue that might otherwise be used for other tasks. This may be a particularly acute problem with large inventory systems that may have, for example, tens of thousands of inventory holders and/or that may be required to process a high number of inventory items per hour. Such systems may be forced into a trade-off between using larger queues requiring more mobile drive units and higher costs and using smaller queues and less mobile drive units at lower costs and/or throughput. Accordingly, the teachings of the present disclosure provide an inventory system with connectable inventory holders. Connectable inventory holders may be capable of being transported individually by mobile drive units or connected together and transported by one or more mobile drive units as a group. For example, a connectable inventory holder may be individually transported to a queue where it is then connected to or used to form a group of connected inventory holders. For example, each inventory holder may include one or more connection mechanisms, such as clamps or hooks that can be actuated by a mobile drive unit to connect the inventory holder to an adjacent inventory holder. By connecting multiple inventory holders together, a chain or column of connected inventory holders may be formed, allowing the chain or column to be moved together as a group or unit. Because the inventory holders may be connected together and moved as a unit, a mobile drive unit need not be used for every inventory holder to move the group or unit. Accordingly, groups of connected inventory holders can be formed while those inventory holders wait in a queue and fewer mobile drive units may be used to effectively manage the queue. For example, a column of five connected inventory holders may be moved through the queue by one or two mobile drive units rather than five. As each inventory holder reaches the front of the queue and is processed at the inventory station, it can be disconnected from the group and returned individually to a storage location or other location. Even greater efficiencies may be realized by using a queue having multiple columns of connected inventory holders. For instance, once one column of connected inventory holders is processed, the next column may be moved up in the queue to take the first column's place. An illustrative queue might contain eight rows of five columns of connected inventory holders (having a total of forty inventory holders in queue). Rather than using forty mobile drive units to manage the queue, such an arrangement may be managed by as few as one to four mobile drive units by utilizing queue management techniques as disclosed in more detail below. Thus, using such techniques to manage groups of connected inventory holders, relatively large queues may be deployed and managed with relatively fewer mobile drive units. Accordingly, inventory systems may be capable of deploying larger inventory systems with larger queues and higher throughput at a lower economic cost and greater efficiency.

Similar advantages can be realized using connectable inventory holders for shipping purposes. For example, multiple connectable inventory holders can be connected together into a group suitable for shipment. Accordingly, rather than have a mobile drive unit individually load each inventory holder into a shipping crate or shipping vehicle, a relatively fewer number of mobile drive units can be used to load groups of connected inventory holders. In addition, crates or trailers can be equipped with connection mechanisms so that inventory holders may be secured for shipment.

As another example, large quantities of inventory holders can be moved from one location to another by a relatively small number of mobile drive units. For example, when a popular inventory item has an expected release date, an inventory system may build up an inventory backlog of that item. The item, however, will not be used to fill orders until the release date. Thus, that item may be stored away from the inventory stations in a less used portion of the warehouse. When the item is released, it may be desirable to move the item in bulk to be closer to the inventory stations so that the item can be used to fill orders in a more timely and efficient manner. To move the item in bulk from one portion of the warehouse to another, the inventory holders storing those items may be connected and moved as a group.

The management module may control and automate creation of connected groups of inventory holders as appropriate to suit the needs of the inventory system. For instance, the management module may instruct one or more mobile drive units to assemble and transport a group of connected inventory holders. To facilitate this ability, the inventory holders may be equipped with sensors, actuators, and/or communications devices to facilitate connection, as described in more detail below. For example, inventory holders may include actuators controllable by mobile drive units that allow the connection mechanism to be engaged in response to a command by a mobile drive unit. Alternatively or in addition, the connection mechanism may be configured to engage when a sensor detects that another inventory holder is in proper position for connection. Accordingly the disconnection and connection of connected inventory bins may be automatically controlled as appropriate during the operation of the inventory system by the management module and/or by mobile drive units.

Technical advantages of certain embodiments of the present disclosure include the ability to provide an inventory system with connected inventory holders. Another technical advantage may include the ability for a management module to automatically control and/or manage the assembly of groups of connected inventory holders. Accordingly, mobile drive units may be instructed to assemble or form groups of connected inventory holders in queues to inventory stations. Mobile drive units may be instructed to move the one or more groups of connected inventory holders through a queue, while adding additional groups of connected inventory holders and/or disconnecting individual inventory holders from a group as appropriate. Thus, connectable inventory holders may allow greater queue sizes to be achieved and/or fewer mobile drive units to be used than would otherwise be achievable using other techniques. Mobile drive units may, in some embodiments, assemble or form groups of connected inventory holders for shipment, which may allow for fewer mobile drive units to be used during the shipping process than would otherwise be achievable. Another technical advantage may include the ability to move large groups of inventory holders in masse by a limited number of mobile drive units. Further technical advantages of certain embodiments of the present invention may include providing a flexible and scalable inventory storage solution that can be easily adapted to accommodate system growth and modification. Other technical advantages of the present invention will be readily apparent to one skilled in the art from the following figures, descriptions, and claims.

While specific advantages and examples have been enumerated above, various embodiments may include all, some, or none of the enumerated advantages or examples. Embodiments of the present invention and its advantages are best understood by referring to FIGS. 1 through 11, wherein like numerals refer to like and corresponding parts of the various drawings.

FIG. 1 is an illustration of an example embodiment of an inventory system 10. As illustrated, inventory system 10 includes a management module 15, one or more mobile drive units 20, one or more inventory holders 30, and one or more stations 50. Each inventory holder 30 is configured to store inventory items 32 and include at least one connection module 34. Connection module 34 is configured to allow one inventory holder 30 to connect with another inventory holder 30. As illustrated, four inventory holders 30 are shown as connected by connection modules 34 to form a group 100 of connected inventory holders 30. Group 100 is depicted as being transported to stations 50 by mobile drive units 20. In general, management module 15 manages the administration and coordination of the various elements of system 10 in order to fulfill orders received by system 10. In response to commands communicated by management module 15, mobile drive units 20 may transport inventory holders 30 to various locations within inventory system 10, such as to stations 50. Management module 15 may determine to assemble group 100 of connected inventory holders 30 at, for example, stations 50. Mobile drive units 20 may accordingly transport inventory holders 30 to stations 50 and form group 100. Group 100 may then be transported by one or more mobile drive units 20. In the illustrated embodiment, two mobile drive units 20 are docked with different inventory holders 30 at each end of group 100 and are transporting group 100 to stations 50.

Management module 15 receives and/or generates requests and may initiate particular operations involving mobile drive units 20, inventory holders 30, inventory items 32, stations 50, and/or other elements of inventory system 10. Management module 15 may select components of inventory system 10 to perform these operations and communicate commands, instructions, and/or other appropriate information to the selected components to facilitate completion of these operations. Management module 15 may receive orders for various inventory items 32 and coordinate and administer various appropriate tasks to fill the orders. Management module 15 may receive orders from any appropriate system or component, and may alternatively or additionally generate tasks and assign tasks to various components of inventory system 10 using any appropriate techniques. In particular embodiments, management module 15 generates task assignments based, in part, on orders including requests for inventory items 32 that management module 15 receives from other components of inventory system 10 and/or from external components in communication with management module 15. Based on the orders, management module 15 may identify particular operations to be completed involving inventory items stored or to be stored within inventory system 10 and may represent communication of any suitable form. For example, in particular embodiments, an order may specify particular inventory items 32 that have been purchased by a customer and that are to be retrieved from inventory system 10 for shipment to the customer. Although the description below discusses embodiments of inventory system 10 that receive orders for various inventory items 32 management module 15 may receive other orders and/or operations requests from any appropriate system or component, and may alternatively or additionally generate such orders and/or requests itself using any appropriate techniques.

After generating one or more task assignments, management module 15 may select appropriate components to complete particular tasks and transmit task assignments to selected components to trigger completion of the relevant tasks. The relevant components then execute their assigned tasks. Each task assignment defines one or more tasks to be completed by a particular component. These tasks may relate to the retrieval, storage, replenishment, and counting of inventory items 32 and/or the management of mobile drive units 20, inventory holders 30, stations 50 and other components of inventory system 10. Depending on the component and the task to be completed, a particular task assignment may identify locations, components, and/or actions associated with the corresponding task and/or any other appropriate information to be used by the relevant component in completing the assigned task. During the course of operating inventory system 10, management module 15 may determine, based on various factors, to assemble or form group 100 and/or add an inventory holder 30 to a group 100 of connected inventory holders 30 for transportation by one or more mobile drive units 20. For example, management module 15 may determine to form group 100 at a queue to a station 50. As another example, management module 15 may determine to assemble at a shipping station a group 100 of connected inventory holders 30 that store processed orders ready for shipment. Accordingly, management module 15 may assign tasks instructing various mobile drive units 20 to assemble groups 100, transport groups 100, and/or disassemble groups 100. In some embodiments, management module 15 may assign tasks to add or remove individual inventory holders 30 to or from group 100 as appropriate. Mobile drive units 20 may accordingly be capable of moving inventory holder 30 into position to be connected to another inventory holder 30 in group 100. Mobile drive unit 20 may then, in some embodiments, cause connection module 34 to be activated and thereby connect the inventory holder to another inventory holder 30.

Management module 15 may be capable of determining particular patterns, arrangements, and/or quantities of inventory holders in group 100 based on various factors and/or based on the purpose of group 100. For instance, management module 15 may determine to assemble chain, row, or column of connected inventory holders 30 to wait in a queue to stations 50. The number of inventory holders 30 in groups 100 may be based, for example, on the size of the desired queue, which may be determined dynamically based on the work capacity or desired throughput of inventory system 10. To illustrate, management module 15 may determine to increase the size of the queue and/or the size and/or number of groups 100 in the queue based on detecting an increase in number of orders to be processed by inventory system and/or determining that a number of orders to process is above a predetermined threshold.

While the appropriate components of inventory system 10 complete assigned tasks, management module 15 may interact with the relevant components to ensure the efficient use of space, equipment, manpower, and other resources available to inventory system 10. For example, management module 15 may receive information from the various components of system 10 regarding their current location, state, and/or other characteristics. Based on its knowledge of the location, current state, and/or other characteristics of the various components of inventory system 10 and an awareness of tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10 involving inventory items 32. As a result, some embodiments of management module 15 may, by implementing one or more management techniques described below, enhance the efficiency of inventory system 10 and/or provide other operational benefits.

Mobile drive units 20 move inventory holders 30 between locations within a workspace associated with inventory system 10. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered robotic devices configured to freely move about the associated workspace. In alternative embodiments, mobile drive units 20 represent elements of a tracked inventory system 10 configured to move inventory holder 30 along tracks, rails, cables, or other guidance elements traversing the associated workspace. In such embodiments, mobile drive units 20 may receive power through a connection to the guidance elements, such as a powered rail.

Mobile drive units 20 may transport inventory holders 30 by docking with and/or coupling to a particular holder and moving the holder while docked. Mobile drive units 20 may similarly transport a group 100 of connected inventory holders 30 by docking with and/or coupling to a particular inventory holder 30 in group 100 and moving while docked. In some embodiments, two or more mobile drive units 20 may coordinate to transport group 100 of connected inventory holders 30. For example, as illustrated, two mobile drive units 20 that are docked with inventory holders 30 coordinate to transport group 100 of inventory holders 30. Mobile drive units 20 may transport inventory holder 30 by moving beneath inventory holder 30 and lifting a docking head that interfaces with a portion of inventory holder 30. The docking head may be controlled by an actuator of mobile drive unit 20 operable to lift and/or couple to inventory holder 30 when docked. The docking head of mobile drive unit 20 may couple mobile drive unit 20 to inventory holder 30 and/or at least partially support inventory holder 30 when mobile drive unit 20 is docked to inventory holder 30. Mobile drive unit 20 may utilize the docking head to maneuver inventory holder 30, such as by lifting inventory holder 30, propelling inventory holder 30, rotating inventory holder 30, and/or moving inventory holder 30 in any other appropriate manner. The docking head of mobile drive unit 20 may also include any appropriate combination of components to facilitate such manipulation of inventory holder 30. For example, in some embodiments, a high-friction portion may form all or a portion of the docking head, which abuts a portion of inventory holder 30 while mobile drive unit 20 is docked to inventory holder 30. In such embodiments, frictional forces created between the high-friction portion of the docking head and a surface of inventory holder 30 may induce translational and rotational movement in inventory holder 30 when mobile drive unit 20 actuates docking head and/or when mobile drive unit 20 actuates its wheels to move. In some embodiments, the docking head may include raised and/or corrugated portions that align with corresponding depressed and/or corrugated portion of inventory holder 30. In some embodiments, mobile drive units 20 may lift inventory holders 30 off the ground while docked. Additionally or alternatively, mobile drive unit 20 may raise the docking head against a surface of inventory holder 30 to create sufficient frictional force to allow mobile drive unit 20 to move inventory holder 30 while casters on legs of inventory holder 30 remain in contact with the ground.

In some embodiments mobile drive unit 20 may be capable of rotating its docking head to rotate inventory holder 30 while moving and/or while stopped. In addition or in the alternative, mobile drive unit 20 may be capable of rotating the docking head independently or as a part of the movement of mobile drive unit 20 as a whole. For example, mobile drive unit 20 may rotate inventory holder 30 as mobile drive unit 20 executes a turn such that inventory holder 30 continues to face the original direction of movement. As another example, mobile drive unit 20 may rotate inventory holder 30 so that an appropriate face of inventory holder 30 is oriented towards stations 50. The rotation may occur, for example, before mobile drive unit 20 connects inventory holder 30 to group 100. While lifted, mobile drive unit 20 may control another actuator or actuators driving power to its wheels. Using the wheel actuators, mobile drive unit 20 may be capable of transporting inventory holder 30 while the docking head is lifting inventory holder 30 or while mobile drive unit 20 is undocked and/or uncoupled from inventory holder 30. As illustrated, mobile drive unit 20 includes a pair of stabilizer wheels in addition to the motorized wheels powered by one or more actuators.

It should be noted that while a particular method of docking with inventory holder 30 is illustrated, mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within inventory system 10. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

Mobile drive units 20 may be capable of communicating with management module 15 to receive information identifying selected inventory holders 30, transmit locations of mobile drive units 20, or exchange any other suitable information used by management module 15 or mobile drive units 20 during operation. Mobile drive units 20 may communicate with management module 15 wirelessly, using wired connections between mobile drive units 20 and management module 15, and/or in any other appropriate manner. As one example, some embodiments of mobile drive unit 20 may communicate with management module 15 and/or with one another using Wi-Fi (IEEE 802.11), Bluetooth (IEEE 802.15), Infrared Data Association standards, or any other appropriate wireless communication protocol. As another example, in a tracked inventory system 10, tracks or other guidance elements upon which mobile drive units 20 move may be wired to facilitate communication between mobile drive units 20 and other components of inventory system 10.

Mobile drive units 20 may be capable of communicating with connection modules 34 in a similar manner as described above with respect to management module 15. In particular embodiments, mobile drive unit 20 may include a communication port and/or interface that interfaces with a corresponding interface of inventory holder 30 while mobile drive unit 20 is docked with that inventory holder 30. For example, mobile drive unit 20 may include a communication port located on its docking head that interfaces with an appropriate port located on the lower surface of inventory holder 30. Accordingly, mobile drive unit 20 may communicate with connection modules 34. Mobile drive unit 20 may, for example, receive status information regarding the connection status, repair status, or other appropriate status of connection module 34. For example, the connection status may indicate whether or not a given connection module 34 is connected to another inventory holder 30. Connection status may also indicate the connection status of other connection module 34 of inventory holders 30 that are connected to the given connection module 34. Connection status may be provided for all connection modules 34 in group 100 of connected inventory holders 30. Moreover, each inventory holder 30 in a group 100 of connected inventory holders 30 may be capable of transmitting status information to one or more mobile drive units 20 transporting that group 100. In some embodiments, connection module 34 may be capable of transmitting status indicating the weight of inventory holder 30 and/or weight distribution to the legs of inventory holder 30. Accordingly, inventory holder 30 may be equipped with appropriate sensors, such as force gauges, which may allow connection module 34 to receive information related to the weight of inventory holder 30. For example, a newtometer may be equipped on one or more of the legs of inventory holder 30, which may allow connection module 34 to receive the weight on each leg and/or determine a distribution of weight in inventory holder 30. Such information may be transmitted to mobile drive unit 20 and/or management module 15, which may utilize the information in its decision making process. For instance, management module 15, may determine based on weight and/or weight distribution, how many mobile drive units 20 should be used to move a particular group 100. Additionally or alternatively, management module 15 may determine to group 100 inventory holders 30 that have particular weight and/or weight distribution characteristics, such as a desired and/or maximum weight. As another example, management module 15 may make decisions as to how mobile drive unit 20 is to transport inventory holder 30 and/or group 100. Mobile drive units 20 may transport inventory holders 30 with imbalanced weight distributions slower and/or with different and/or lower rates of acceleration and/or deceleration than inventory holders 30 that have balanced weight distribution.

In some embodiments, connection module 34 may be capable of transmitting a unique identifier to mobile drive unit 20. Such an identifier may be utilized by management module 15 and/or mobile drive unit 20 to provide a check on whether the inventory holder 30 at a particular location is the same as the one that is expected. If the inventory holder 30 is not the one that is expected when mobile drive unit 20 receives the unique identifier, management module 15 may update and/or correct the location of that inventory holder 30.

In some embodiments, connection module 34 may include an appropriate sensor capable of detecting the proximity of another inventory holder 34. Accordingly, connection module 34 may transmit a signal indicating proximity information to mobile drive unit 20. Alternatively or in addition, connection module 34 may transmit a signal indicating when another connection module 34 and/or inventory holder 30 is within a predetermined distance and/or in contact with connection module 34. Mobile drive unit 20 may also communicate activation signals or other appropriate commands to connection module 34 to cause connection module 34 to actuate its connection mechanisms and connect to hook, latch, clamp, and/or otherwise connect to another inventory holder 34. For instance, mobile drive unit 20 may determine, based on proximity information received from connection module 34, that inventory holder 34 is in proper alignment with another inventory holder 30. Accordingly, mobile drive unit 20 may then activate connection module 34 to initiate the connection of connection module 34 to another inventory holder 30. Mobile drive units 20 may be capable of communicating with one, some, or all of the connection modules 34 in group 100. For example, connection modules 34 may be configured to include appropriate communications devices, interfaces, and/or ports that allow communications to be established between the various inventory holders 34 in group 100. Accordingly, mobile drive units 20 that are docked with an inventory holders 30 may communicate with all, some, or none of the connection modules 34 that are in group 100.

Inventory holders 30 store inventory items 32 and may include one or more connection modules 34. Inventory holders 30 may represent any appropriate holder for storing items, including shipping containers, totes, bins, cartons, boxes, or other appropriate containers. In some embodiments, inventory holders 30 include multiple storage bins with each storage bin capable of holding a different type of inventory item 32. Inventory holders 30 are capable of being carried, rolled, or otherwise moved by mobile drive units 20. In some embodiments, inventory holder 30 may provide additional propulsion to supplement that provided by mobile drive unit 20 when moving inventory holder 30. Additionally, in particular embodiments, each inventory holder 30 may have a plurality of faces, and each bin may be accessible through specific faces of the relevant inventory holder 30. Mobile drive units 20 may be configured to rotate inventory holders 30 at appropriate times to present particular faces of inventory holders 30 and the associated bins to an operator or other components of inventory system 10. In some embodiments, inventory holders 30 include one or more connection modules 34 on each face of inventory holders 30. For example, in some embodiments in which inventory holders 30 have four faces, connection modules 34 may be mounted on all four faces. As another example, connection modules 34 may be mounted on two opposite faces. Thus, inventory holders 30 may be capable of being connected to another inventory holder 30 in any appropriate orientation and/or connected an inventory holder 30 at one or more or all of its connection modules 34. Moreover, inventory holders 30 may be capable of being connected into any appropriate group 100 of inventory holders 30 having any appropriate pattern and/or configuration. Thus, group 100 may represent any appropriate arrangement of connected inventory holders 30. Group 100 may represent a column, row, cluster, chain, grid, or any other appropriate pattern of connected inventory holders 30. For example, group 100 may represent a single column of connected inventory holders 30 that is one inventory holder 30 wide by four or five inventory holders 30 long. As another example, group 100 may represent a grid of connected inventory holders 30, such as a two by two grid of connected inventory holders 30. Group 100 may also represent a three-by-three grid, four-by-four grid, three-by-six grid, or any other appropriate grid of any length n and/or width m. A grid may be formed by connecting together the sides of one or more columns of connected inventory holders. It should be noted, however, that while groups 100 having particular configurations have been provided by way of example only, that the teachings of the present disclosure extend to any appropriate configurations, including columns of any appropriate length and/or grids of any appropriate numbers of connected inventory holders 30. In particular embodiments, management module 15 may be capable of determining an appropriate length and/or size of group 100 based in part upon the power and/or torque of available mobile drive units 20 and/or based on the collective weight of group 100. Management module 15 may additionally or alternatively determine to utilize an appropriate number of mobile drive units 20 to transport a particular group 100 based the torque and/or power required to transport a particular group 100. Inventory holders 30, in some embodiments, may be deployed with a set of one or more brakes, which may be locked to prevent rolling of the casters on one or more legs of inventory holders 30. The brakes may be actuated in response to commands from connection modules 34, which may in turn be controlled by mobile drive units 20 in communication with connection modules 34. Accordingly, one or more brake lines and/or communications paths may be routed from connection module 34 to the brakes of inventory holder 30. In some embodiments, inventory holders 30 may be configured to be placed into containers and/or shipping containers for shipment. Shipping containers may additionally or alternatively include connection modules 34 and may function in the same or similar manner as described herein with respect to inventory holders 30.

Inventory items 32 represent any objects suitable for storage, retrieval, and/or processing in an automated inventory system 10. For the purposes of this description, "inventory items" may represent any one or more objects of a particular type that are stored in inventory system 10. As one example, inventory system 10 may represent a retail distribution warehouse that stores bulk inventory items 32 for retail facilities, such as grocery stores and/or merchandise warehouses. As another example, inventory system 10 may represent a mail order warehouse facility, and inventory items 32 may represent merchandise stored in the warehouse facility. During operation, mobile drive units 20 may retrieve inventory holders 30 containing one or more inventory items 32 requested in an order to be packed for delivery to a customer. Inventory holders 30 storing inventory items 32 to be processed at stations 50 may be assembled by mobile drive units 20 into groups 100 of connected and/or connected inventory holders 30. Moreover, in particular embodiments of inventory system 10, boxes containing completed orders may themselves represent inventory items.

Connection modules 34 represent any appropriate combination of devices, components, hardware, software, and controlling logic operable to connect and/or interconnect one inventory holder 30 to another inventory holder 30. Connection modules 34 may include appropriate connection mechanisms such as hooks, clamps, latches, connectors, claws, magnets, or other appropriate connection elements operable to connect to another inventory holder 30. Connection module 200 may be capable of connecting to another inventory holder 30 at any appropriate structural portion of that inventory holder 30. Alternatively or in addition, connection module 200 may connect to another connection module 200 of that inventory holder 30. In some embodiments, connection modules 34 may be configured to interconnect with each other, such that a first connection module 34 on one inventory holder 30 is configured to connect to a second connection module 34 on another inventory holder 30 while the second connection module 34 may be configured to connect to the first connection module 34. Connection modules 34 may include any appropriate communications devices and/or sensors to detect the proximity of another inventory holder 30 and/or connection module 34. For example, a sensor on a connection module 34 of a first inventory holder may be operable to detect that a second inventory holder is proximate to the first inventory holder 30. Connection module 34 may be operable to connect the first inventory holder 30 to a second inventory holder 30 based at least in part upon the sensor detecting that the second inventory holder 30 is proximate to the first inventory holder. Connection module 34 may be capable of transmitting status information to mobile drive units 20 and/or other components of system 10 such as management module 15. For example, connection module 34 may transmit status information indicating whether it is connected to another connection module, whether its connection elements are engaged or disengaged, its power state, repair state, or any other appropriate status relevant to the operation of connection modules 34 and/or the assembly or disassembly of groups 100. For instance, connection module 34 may transmit information to mobile drive unit 20 and/or management module 15 that its connection elements are broken and/or not functioning. Accordingly, management module 15 may take into account the repair state of connection modules 15 when assembling groups 100 of connected and/or connected inventory holders 30. Management module 15 may determine not to utilize a particular inventory holder 34 having a repair state indicating a broken and/or not functioning connection module 34 and/or may determine to connect inventory holder 34 utilizing one of its functioning connection modules 34. As another example, connection module 34 may transmit information to mobile drive unit 20 indicating that it is connected to another inventory holder 30. A particular embodiment of connection module 34 is discussed in greater detail below with respect to FIGS. 2 through 4.

Stations 50 may represent any appropriate components for processing or handling inventory items 32, such as scanners for monitoring the flow of inventory items 32 in and out of inventory system 10, communication interfaces for communicating with management module 15, and/or any other suitable components. Stations 50 may be controlled, entirely or in part, by human operators or may be fully automated. Moreover, the human or automated operators of stations 50 may be capable of performing certain tasks to inventory items 32, such as packing or counting inventory items 32, as part of the operation of inventory system 10. In some embodiments stations 50 may include and/or be associated with one or more operator terminals. Stations 50 may include and/or be associated with queues in which one or more various groups 100 of connected and/or interconnected inventory holders 30 may wait for processing. When an inventory holder 30 reaches a processing location at stations 50, which may be at the front of a queue, automated equipment and/or a human operator may remove one or more inventory items 32 from that inventory holder 30 for processing. Mobile drive unit 20 may then disconnect inventory holder 30 from group 100, remove that inventory holder 30 from the queue and/or move that inventory holder 30 to another location within inventory system 10. For example, inventory holder 30 may be returned to inventory storage. Stations 50 may additionally or alternatively represent a shipping station in which inventory holders 30 are stored until an appropriate time for shipment. After an appropriate trigger event is detected, such as a transportation vehicle arriving at a shipping station, groups 100 of connected inventory holders 30 may be loaded onto the vehicle by mobile drive units for shipment. More details of example operations involving groups 100 of connected inventory holders, inventory stations, and shipping stations are discussed below with respect to FIGS. 5-7.

Although "station" as used in the following description refers to locations at which any appropriate processing operation supported by inventory system 10 may be completed, particular embodiments of inventory system 10 may include specialized stations 50 suitable for performing only a single processing task supported by inventory system 10, such as a shipping station. Moreover, a particular embodiment of inventory system 10 may include stations 50 that are, in general, capable of handling multiple types of operation requests but, at any given time, configured to handle only one particular type of operation requests.

FIGS. 2A and 2B are perspective drawings of an example inventory holder 30 and mobile drive unit 20. FIGURE A is a perspective drawing illustrating an example mobile drive unit 20 moving beneath an inventory holder 30 in order to dock with the inventory holder 30. FIG. 2B is a perspective drawing illustrating the lower surface of inventory holder 30 and illustrates a surface against which docking head 214 of mobile drive unit 20 may interface with in order to dock with inventory holder 30. As illustrated, inventory holder 30 includes one or more connection modules 200. Connection modules 200 may be a particular embodiment of connection modules 34 discussed above with respect to FIG. 1. While illustrated as being on two adjacent faces of inventory holder 30, it should be noted that connection modules 200 may be placed on all four sides of inventory holder 30 or on two opposite sides of inventory holder 30. Connection module 200 may include various components including connection elements 202, contact pad 204, a communications interface 206, and sensor 208. Inventory holder 30 may include casters 210 and communications interface 212. Inventory holder 30 may include multiple shelves upon which inventory items 32 may be placed. Inventory holder 30 also includes legs holding up the shelves and at the bottom of each leg casters 210 may allow inventory holder 30 to roll and/or be moved while mobile unit drive 220 is docked with inventory holder 30. Legs of inventory holder 30 may form multiple openings between which mobile drive unit 20 may pass while moving beneath inventory 30 in order to dock with inventory 30.

Connection elements 202 represent any appropriate combination of hooks, latches, clamps, connectors or other connection elements operable to connect to a portion of another inventory holder 30, such as another connection module 200. For example, connection elements 202 may represent a set of multiple clamping elements or claws configured to latch onto and/or clamp to another connection module 200 on another inventory holder 30. Connection module 200 of the other inventory holder 30 may similarly latch and/or clamp onto the illustrated connection module 200. A more detailed illustration of how the two connection modules 200 may interconnect is illustrated below and discussed with respect to FIGS. 4A-4D.

Contact pad 204 represents any appropriate material or materials operable to absorb the force and/or shock. For example, contact pad 204 may absorb the shock of another inventory holder 30 being moved up against connection module 200. For example, contact pad 204 may be a shock absorber made of rubber or other appropriate material. Contact pad 204 may be configured to allow two inventory holders 30 to come into contact with each other without damaging, dislocating or otherwise disturbing connection modules 200.

Communications interface 206 represents any appropriate communication interface operable to transmit information from one connection module 200 to another connection module 200. Communication interface 206 may utilize any of the above discussed communications protocols discussed with respect to mobile drive units 20, including any of the above aforementioned wireless communication standards. Additionally or alternatively, communications interface 206 may represent a wired and/or physical interface, which may include a plurality of contacts for data communication contact and/or providing power to and/or from another connection module 200. Communications interface 206 may include contacts able to connect to a connection module 200 when placed in contact with the other connection module 200. For example, the contacts may be flat conductive elements that abut against each other to provide connectivity. Accordingly, when connection modules 200 are connected to each other, a communications network may be formed by the various inventory holders 30 in group 100. It should be understood, however, that while a particular embodiment of communicating is described as an example, inventory holders 30 in group 100 may communicate with each other and/or with mobile drive units 20 in any appropriate manner.

Sensor 208 represents any appropriate sensor capable of detecting the proximity of another connection module 200 and/or inventory holder 30. For example, sensor 208 may represent a photo sensor and/or camera operable to detect and/or determine that an object approaching is an inventory holder 30. Additionally or alternatively, sensor 208 may represent a magnetic and/or capacitive touch sensor, magnetic plate, or other sensor operable to respond to the presence, contact, and/or touch of another connection module 200 and/or a portion of inventory holder 30 to which connection module 200 is configured to connect to.

Casters 210 represent any appropriate wheels, rollers, skids or other device operable to allow inventory 30 to move along the ground while docked with mobile drive unit 20. Casters 210 may be provided to facilitate the movement of inventory holders 30 that are in group 100 but are not directly docked with mobile drive units 20. For example, in a four inventory holder 30 group 100 of connected inventory holders 30, the two inventory holders 30 on each end may be docked with a mobile drive unit 20 while inventory holders 30 in between the ends are not. Thus, movement by mobile drive units 20 may induce the movement of inventory holders 30, which may be facilitated by casters 210. For example, those inventory holders 30 in group 100 may be configured to roll along as the mobile drive units 20 moves group 100. In should be noted, however, that while illustrated as including casters, inventory holders 30 need not include casters. For example, mobile drive units 20 and/or connection modules 200 may be configured such that mobile drive units 20 are capable of lifting an entire group 100 of inventory holders 30 that are connected in a group 100. In such case, inventory holders 30 may not include casters 210.

Communications interface 212 represents any appropriate interface and/or communication device operable to facilitate communications between connection module 200 and mobile drive unit 20. Communication interface 212 may be similar to and/or the same as communications interface 206. Communications interface 212 may accordingly include contact elements as described above configured to interface and/or connect to communications interface 216. For example, communications interface 216 may include data contacts and/or power contacts as appropriate. As illustrated in FIG. 2B, communications interface 212 is located on a lower surface of inventory holder 30, which may be the surface against which docking head 214 of mobile drive unit 20 docks. A bus and/or communications path may be connected from communications interface 212 to connection module 200. Additionally or alternatively, communications interfaces 206 and 212 may represent the same communications interface and/or may represent one wireless communication device operable to communicate with mobile drive unit 20, other connection modules 200, and/or management module 15.

As illustrated, mobile drive unit 20 includes docking head 214 and communications interface 216. Docking head 214 represents any appropriate device operable to connect mobile drive unit 20 to inventory holder 30. Docking head 214 may be a docking head similar to and/or the same as the docking head described above with respect to FIG. 1. For example, docking head 214 may represent a head that is moveable by mobile drive unit 20 by an actuator and that may be raised against the lower surface of inventory holder 30. Mobile drive unit may raise or lower docking head 214 in response to commands from management module 15.

Communications interface 216 represents any appropriate interface and/or communication device operable to facilitate communications between connection module 200 and mobile drive unit 20. As illustrated in FIG. 2A, communications interface 216 may be located on a surface of docking head 214. Accordingly, when docking head 214 is raised against the lower surface of inventory holder 30, communications interface 216 may interface with and/or connects to communications interface 212. Communications interface 216 may accordingly include corresponding contact elements to communication interface 212. For example, communications interface 216 may include data contacts and/or power contacts as appropriate. Accordingly, communications interface 216 may be utilized to provide power to connection module 200 while mobile drive unit 20 is docked with inventory holder 30. Similarly, communications interface 216 may provide power to and/or communicate with other connection modules 200 that are connected to inventory holders 30 in group 100 via communications interfaces 206. For example, mobile drive unit 20 docked with a first inventory holder 30 in a group 100 of four inventory holders 30 may provide power and/or communicate with connection modules 200 of each of the four inventory holders 30. Mobile drive unit 20 may communicate with each connection module 200 through each successive communications interface 206 of each inventory holder 30. Alternatively or in addition, mobile drive unit 20 may charge a battery or other rechargeable power source of connection module 200 while in connection with inventory holder 30.

In operation, mobile drive unit 20 may receive an instruction and/or task assignment to transport inventory holder 30 from a first location to a second location within inventory system 10. For example, mobile drive unit 20 may receive an instruction to form a particular group 100 of inventory holders 30 at a particular location. In response, mobile drive unit 20 may move to the location of inventory holder 30 and dock with inventory holder 30. In some embodiments, mobile drive unit 20 may pass between the legs of inventory holder 30, align itself such that docking head 214 is aligned with a particular portion of inventory holder 30 beneath inventory holder 30. For example, inventory holder 30 may include a reference point or marker and mobile drive unit 20 may utilize one or more sensors to align with the reference point or mark. Thus, mobile drive unit 20 may insure that docking head 214 and/or communications interface 216 are properly aligned before docking with inventory holder 30. Once aligned, mobile drive unit 20 may then actuate its docking head 214 to be raised against a surface of inventory holder 30. Raising docking head 214 against the surface of inventory holder 30 may, in some embodiments, connect communications interfaces 216 and 212. Accordingly, mobile drive unit 20 may establish a communications session with connection module 200 during the process and/or after docking with inventory holder 30. Mobile drive unit 20 may additionally or alternatively establish communications sessions with each of the connection modules 200 that are connected to inventory holder 30 in group 100. It should be noted, however, that mobile drive unit 20 may be capable of establishing communications sessions with connection modules 200 at any appropriate time, including using any appropriate interface such as a wireless interface.

Mobile drive unit 20 may receive various status information from connection module 200 such as a repair status, the engagement status of connection elements 202, and/or any of the aforementioned statuses that were discussed with respect to FIG. 1. Accordingly, mobile drive unit 20 may then proceed to transport the first inventory holder 30 to a second location within inventory system 10. For example, management module 15 may instruct mobile drive unit 20 to assemble and/or form a group 100 of connected inventory holders 30 at a particular location. Mobile drive unit 20 may accordingly transport first inventory holder 30 to the location of a second inventory holder 30 to be connected into group 100. For example, mobile drive unit 20 may move first inventory holder 30 towards second inventory holder 20 until mobile drive unit 20 receives information from sensor 208 indicating the proximity of the second inventory holder 30 and/or that the second inventory holder 30 is within a predetermined distance of inventory holder 30. For example, mobile drive unit 20 may move inventory holder 30 towards the other inventory holder 30 until the second inventory holder's connection module 200 makes contact with contact pad 204 of first inventory holder 30. Such contact may trigger sensor 208 to indicate that the second inventory holder 30 is proximate and/or in position to be connected into group 100. Alternatively or in addition, sensor 208 may periodically transmit to mobile drive unit 20 information indicating a proximity to the second inventory holder 30, which may indicate its distance from inventory holder 30. The distance falls below a predetermined threshold may be calculated to be a sufficient distance that allows connection of the two inventory holders 30.

Once the two inventory holders 30 are sufficiently close together, mobile drive unit 20 may transmit a signal for connection module 200 to activate its connection elements 202. In response, connection module 200 may engage connection elements 202 of connection module 200 onto the second inventory holder. For example, connection elements 202 may clamp, latch, hook, or otherwise connect to connection module 200 of the second inventory holder. Before, during, and/or after activating connection elements 202, the first communications interface 206 connect to the second communication interface 206 of the second connection module 200. Accordingly, mobile drive unit 200 and the first connection module 200 may establish a communication session with the second connection module 200. Mobile drive unit 20 may, in some embodiments, instruct the second connection module 200 to activate its connection elements 202 onto the first connection module. In some embodiments, communications may be established with both connection modules 200 and both connection elements 202 may be activated by mobile drive unit 20 at or near substantially the same time. Alternatively or in addition, first connection elements 202 may be engaged by mobile drive unit 20 to connect to the second connection module 200, the communications session may be established, after which the second connection elements 202 may be engaged. It should be understood, however, that connection may occur in any suitable order. Accordingly, mobile drive unit 20 may determine that the first inventory holder 30 is connected with the second inventory holder 30.

Using these techniques, mobile drive units 20 may move multiple inventory holders 30 together for connection and form and/or to assemble groups 100 of connected inventory holders 30. For example, after the first inventory holder 30 is connected to the second inventory holder 30 to form all or a portion of group 100, mobile drive units 20 may transport additional inventory holders 30 to group 100 to be connected and/or transport group 100 to another inventory holder 30 to be connected. For example, a mobile drive unit 20 may move the first and second connected inventory holders 30 to connect to a third inventory holder 30. Once the third inventory holder 30 is in position, mobile drive unit 20, which may be docked with the first inventory holder 30, may instruct the second inventory holder 30 to connect to the third inventory holder 30. Mobile drive units 20 may be instructed by management module 15 to present a particular face or faces of inventory holders 30 for connection between connection modules 200 of the inventory holders 30 in group 100. Accordingly, mobile drive units 20 may be capable of forming groups 100 having any particular patterns and/or arrangements. To illustrate, mobile drive units 20 may form a group 100 of four connected inventory holders 30 arranged in a single file chain or column. It should be noted, however, that while a specific example is provided for illustration, any appropriate pattern or arrangement having any number of inventory holders 30 may be used.

After connecting to inventory holders 30 into group 100, mobile drive units 20 may be instructed to transport the group 100 to another location within inventory system 10 as a group 100. Thus, mobile drive unit 20 may move the first inventory holder 30 and the second holder 30 from a first location to a second location while the mobile drive unit 20 is docked with the first inventory holder 30 and while the first inventory holder 30 is connected with the second inventory holder 30. In some embodiments, two or more drive units may coordinate to transport group 100. For example, two mobile drive units 20 may coordinate to transport a column or chain of four or five inventory holders 30. In some embodiments, mobile drive units 20 may dock with inventory holders 30 at an inventory holder 30 at each end of the group 100 (such as is illustrated in FIG. 1). To coordinate movement, mobile drive units 20 may exchange path information and/or collision information regarding any obstacles in the path of the group 100 of inventory holders 30. Similarly, management module 15 may plan paths and/or reserve segments of paths for group 100 of inventory holders 30 in order to move it from one location to another within inventory system 10.

Mobile drive units 20 may also disconnect inventory holders 30 and/or disassemble groups 100 in any appropriate manner. For example, a group 100 may be disassembled by mobile drive unit 20 by disconnecting the inventory holder 30 furthest away in a chain or column. To illustrate, in a column of three inventory holders, mobile drive unit 20 docked with the first inventory holder may instruct the third inventory holder to disconnect from the second inventory holder. In particular embodiments, this may include several commands to the connection modules 200 of the second and third inventory holders. Mobile drive unit 20 may first instruct the third connection module 200 on the third inventory holder 30 to disconnect from the second inventory holder 30. Mobile drive unit 20 may then instruct the second connection module 200 to disconnect from the third inventory holder 30. After verifying that the third inventory holder 30 is disconnected, mobile drive unit 20 may repeat the procedure with the second inventory holder 30 and the first inventory holder 30. For example, mobile drive unit 20 may query the connection status of each inventory holder 30 to verify that it is disconnected. From time to time, connection modules 200 may malfunction and/or fail to disconnect on command by mobile drive unit 20. If mobile drive unit 20 determines that an inventory holder 30 is still connected after issuing a disconnect command, mobile drive unit 20 may report such status back to management module 15. Management module 15 may then instruct mobile drive unit 20 to transport the group 100 of inventory holders 30 to an appropriate station, such as a repair station, where the connection modules 200 may be fixed and/or replaced. In some embodiments, mobile drive unit 20 may simply disconnect the inventory holder 30 that it is docked with and/or leave the remaining group 100 of inventory holders 30 connected. Such a disconnection technique may be useful in situations such as a queue of inventory holders 30, as is discussed in more detail below.

Mobile drive units 20 may additionally or alternatively selectively control brakes that may be deployed on some inventory holders 30. Mobile drive units 20 may communicate with and/or control brakes in any appropriate manner, such as through the communications interface with connection module 200. Mobile drive units 20 may employ brakes to aid in stopping and/or slowing inventory holders 30 and/or groups 100 of inventory holders 30. Mobile drive units 20 may also set brakes before disconnecting from inventory holder 30 so that inventory holders 30 may remain parked in a particular place without rolling or moving away. For example, a floor or surface of workspace 70 may be uneven and parking brakes may be set to prevent movement of inventory holders 30 when parked. As another example, brakes may be set when inventory holders 30 are moved into a vehicle for shipment to a remote destination. Additionally or alternatively, brakes can selectively be set for a portion of inventory holders 30 in a group 100 to facilitate rotation and/or movement of groups 100. To illustrate, a brake on one leg of an inventory holder 30 at a corner of a group 100 arranged in a three-by-three grid may be set, which may allow that leg to act as a pivot point for moving the group 100 around a corner or otherwise turning or rotating group 100. Any appropriate brake may be set depending on the desired rotation maneuver.

FIGS. 3A-3C are views of an example connection module 34 of an inventory holder 30. FIG. 3A is a front view illustrating an example connection module 200 mounted to a portion 218 of inventory holder 30. FIG. 3B is a side view of connection module 200 and FIG. 3C is a top view of connection module 200. Portion 218 may represent any appropriate strut, bar, member, or other structural element of inventory holder 30 to which connection module 200 may be mounted and/or installed.

As illustrated in FIG. 3A, connection module 200 may include a plurality of connection elements 202 that extend laterally from the main body of connection module 200. As illustrated, connection module 200 includes two pairs of three connection elements 202 extending from either side of connection module 200. Each connection element 202 may include an elongated portion and a bent portion. The bent portion may be used to hook and/or clamp onto a portion of another inventory holder 30. As illustrated, the bent portions are at the end of each connection element 202 and extend at, for example a substantially orthogonal angle to the elongated portion of connection element 202.

As illustrated in FIG. 3B, connection elements 202 may be connected to hinges 220 which may be actuatable in response to commands transmitted to connection module 200. Additionally or alternatively, hinges 220 may be configured to be initiated automatically based on contact with another connection module. FIG. 3B also illustrates an example configuration of a contact pad 204 and sensor 208. When another contact pad 204 comes into contact with connection module 200 it may compress contact pad 204, which may place detectable pressure and/or stress on sensor 208. In response, sensor 208 may transmit a signal to connection module 200 and/or mobile drive unit 20 to indicate the presence of another connection module 200. That signal may cause mobile drive unit 20 and/or connection module 200 to activate hinges 220 and clamp the connection elements 202 onto the other connection module 200.

FIG. 3C is a top view of the connection elements 202 and hinges 220. As illustrated the connection element 202a at the top is in an engaged position while the connection element 202b at the bottom is in a disengaged position. The bent portions of connection elements 202 may extend behind a structural element or portion of another inventory holder 30. Hinges 220 may hold those connection elements in place so that the portion of the other inventory holder 30 is kept by the bent portions while engaged. Thus, connection elements 202 may hook and/or clamp onto a portion of another inventory holder 30 such as unto its connection module 200. While illustrated as one being engaged and one clamping element being disengaged it should be understood that connection elements 202 may be configured to engage at substantially the same time in order to connect to a connection module 200 of another inventory holder 30.

FIGS. 4A-4D are views illustrating an example method of connecting two inventory holders 30 using connection modules 200 for an inventory holder 30. In general, a first inventory holder 30a may be moved by a mobile drive unit 20 towards another inventory holder 30b. Once the two inventory holders 30a are sufficiently close together, for example, such that a receiving portion of inventory holder 30b is within reach of connection elements 202, mobile drive unit 20 causes connection modules 200 to engage their respective connection elements 202 and connect the two inventory holders 30 together.

As illustrated in FIG. 4A, as inventory holder 30a is moved towards inventory holder 30b, sensor 208 may transmit proximity information to mobile drive unit 20. Mobile drive unit 20 may continue moving towards the other inventory holder 30b until the other inventory holder 30a is within a predetermined distance to the first inventory holder 30.

In FIG. 4B, once inventory holder 30a has come within a predetermined distance and/or is proximate to inventory holder 30b, sensor 208a of inventory holder 30a may transmit a signal to mobile drive unit 20 indicating the presence of the inventory holder 30b. For example, sensor 208a may transmit a signal once the contact pads 204a come into contact with contact pads 204b.

In FIG. 4C, once the mobile drive unit 20 determines that inventory holder 30b is proximate to inventory holder 30a, mobile drive unit 20 may transmit a signal to connection elements 202a of inventory holder 30a to engage connection elements 202a. Connection elements 202a may then be actuated and clamp on to connection module 200b of inventory holder 30b. A communications session may be established between connection module 200a and connection module 200b once communication interface 206a is in contact with communication interface 206b. Accordingly, mobile drive unit 20 may additionally or alternatively establish a communication session with connection module 200b. Mobile drive unit 20 may then initiate engagement of connection elements 202b on connection module 200b such that connection elements 202b engaged onto connection module 200a.

In FIG. 4D, two connected inventory holders 30a and 30b are connected by connection modules 200a and 200b. Once connected, the two inventory holders 30 may be moved together as one group 100 by mobile drive unit 20. Alternatively or in addition, more inventory holders 30 may be added to group 100 as appropriate. It should be noted that while in the illustrated embodiments, each inventory holder 30 is depicted as having one connection module 200 per side, inventory holders 30 may be equipped with any appropriate number of connection modules 200 per side, such as two or more. Those connection modules 200 may be configured to work in parallel and/or may be controlled by a single controller.

It should be noted that while a particular embodiment of connection module 34 is described herein as connection module 200, connection modules 34 and/or 200 may represent any appropriate combination of devices, sensors, actuators, and/or communication devices operable to connect one inventory holder to a second inventory holder operable to connect to inventory holders 30 together in response to commands from management module 15 and/or mobile drive unit 20. Moreover, it is envisioned that the teachings of the present disclosure extend to any appropriate form of connection between inventory holders 30 including but not limited to connection modules 34 and/or 200.

Figure 5:
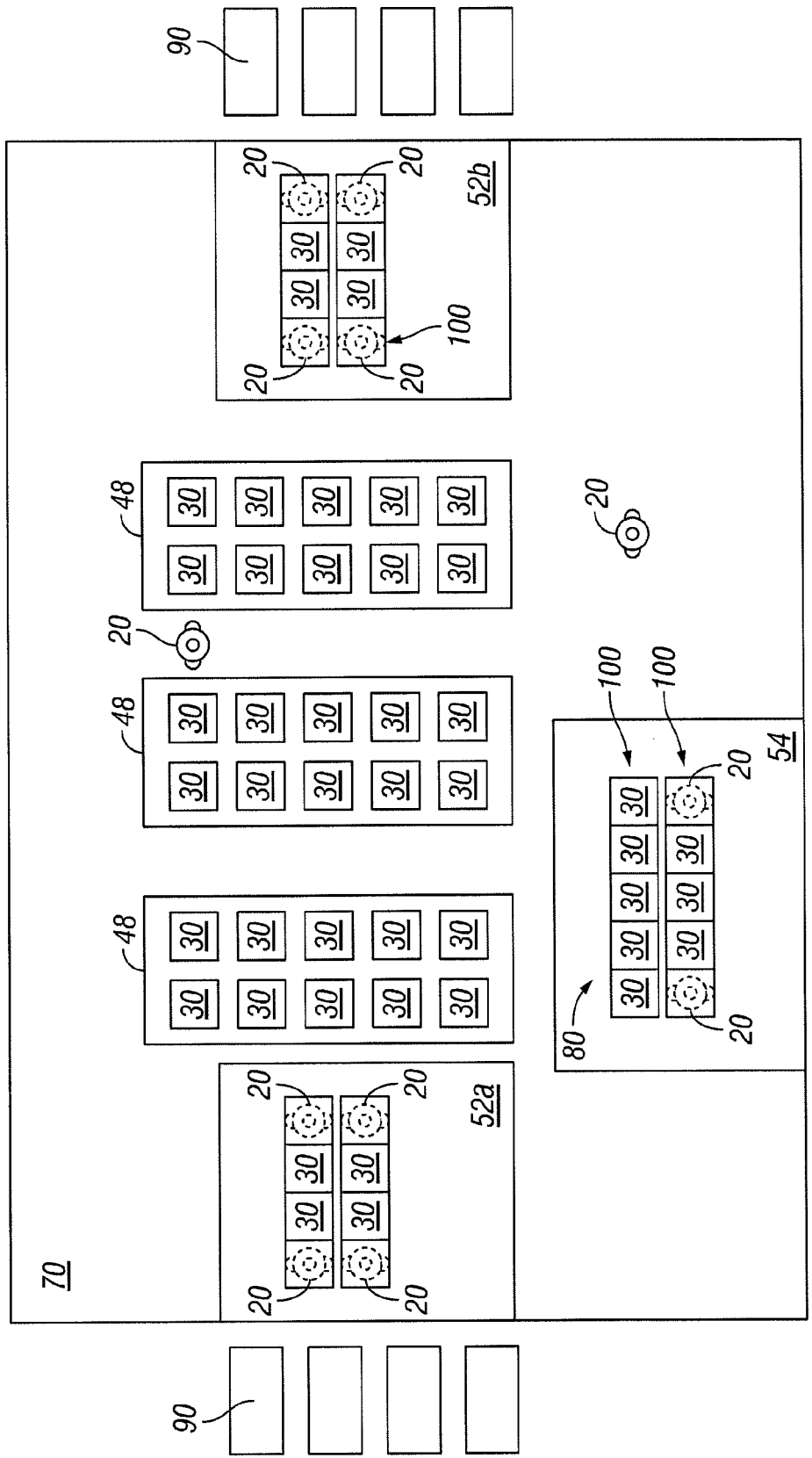
FIG. 5 is a block diagram of an example embodiment of an inventory system.

FIG. 5 is a block diagram of an example embodiment of an inventory system 10. For ease of reference, groups 100 of connected inventory holders are illustrated as being adjacent squares in the illustrated embodiment. Inventory system 10 includes various components as illustrated in FIG. 1 arranged in a workspace 70. Workspace 70 may include multiple portions that may be designated for various purposes. Workspace 70 includes storage areas 48, shipping stations 52, and inventory station 54. Various inventory holders 30 may be stored in inventory storage 48. Shipping stations 52 may include areas in which inventory may be received and/or shipped from inventory system 10 from various shipping vehicles 90. In general, orders for inventory items 32 within inventory system 10 are filled by transporting inventory holders 30 to inventory station 54 within inventory system 10. Inventory items 32 from inventory holders 20 are processed and placed into various containers used to store items on orders at inventory stations 54. Once those containers are completed they may be placed back onto other inventory holders 30 at inventory station 54 and transported to one of shipping stations 52. Once when various inventory holders 30 are ready to ship they may be placed on to vehicles 90 for shipment to a remote destination or facility. New inventory items 32 may also be received at shipping stations 52 from vehicles 90.

Shipping stations 52 represents stations 50 at which tasks associated with shipping, replenishment, and/or replacement inventory items 32 take place. For example, shipping stations 52a may include a loading dock and/or appropriate processing equipment to intake new inventory items 32 into inventory system 10 and/or ship orders of inventory items 32 from inventory system 10. At shipping stations 52a new inventory may be received, broken down, handled, input into inventory system 10 and/or any other appropriate task associated with receiving inventory items 32 into inventory system 10. As illustrated, one or more groups 100 of connected inventory items may arrive on vehicles 90 at inventory station 52. Mobile drive units may enter vehicles 90 to remove groups 100 of connected inventory holders 30. Accordingly, a fewer of mobile drive units 20 may be required to handle the inventory holder 30 processing activities at inventory station 52 then if mobile drive units were used for each individual inventory holder 30. Alternatively or in addition, shipping stations 52 may store inventory holders 30 storing completed orders ready for shipment. Such inventory holders 30 may be transported to shipping station 52b to await a triggering event indicating the completed and/or processed orders stored therein should be shipped. While at shipping stations 52, inventory holders 30 may be sorted and/or organized by shipping destination, shipping date, shipping service, or other appropriate factors. For example, orders being shipped onto the same delivery truck may be associated. Accordingly, mobile drive units 20 may form groups 100 of connected inventory holders 30 at shipping station 52. Groups 100 may include orders that are associated based on any of the above factors.

Inventory station 54 represents any stations 50 at which task related to fulfilling orders take place. At inventory stations 54, inventory items 32 may be picked or placed in the containers and placed on inventory holders 30. Inventory stations 54 may include appropriate equipment to instruct an operator to remove a particular inventory item 32 from inventory holder 30 and place the inventory item 32 into a container and place into another inventory holder 30. In some embodiments, inventory station 54 may interface with conveyance equipment capable of transporting containers to shipping station 52 for shipment. Additionally or alternatively, containers may be transported by mobile drive units 20 to shipping station 52 for shipment. Thus, when a particular order is complete its associated container may be removed from an inventory holder 30 and placed onto conveyance for delivery to shipping station 52. In addition or in the alternative, mobile drive unit 20 may move inventory holder 30 away from inventory station 54 and transport inventory holder 30 to shipping station 52. Moreover it should be noted that while a particular configuration of workspace 70 is illustrated, workspace 70 may include any number and combination of stations 50 such as shipping stations 52 and inventory stations 54.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 5 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 5 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure. In some embodiments, workspace 70 may be equipped with an appropriate imaging system operable to monitor and/or detect images of workspace 70. The imaging system may be mounted and/or installed on any appropriate surfaces of workspace 70, including ceilings, walls, and/or floors. The imaging system may, for example, include any appropriate cameras, photo detectors, digital signal processors, and other appropriate hardware, software, and controlling logic to monitor the position of various components within system 10. The imaging system may, for example, be a stereoscopic imaging system. The imaging system may, in some embodiments, be used in conjunction with and/or in place of sensors of inventory holders 30 to facilitate connection and forming of groups 100. For example, the imaging system may transmit to management module 15 and/or mobile drive unit 20 images and/or information indicating the relative position and/or proximity of two or more inventory holders 30. Based on that information, mobile drive unit 20 may determine when two or more inventory holders 30 are close enough for connection and/or may cause connection modules 34 to be actuated. Such image data may additionally or alternatively be utilized by mobile drive units 20 to correct paths and/or align themselves with appropriate connection points when forming group 100.

Workspace 70 may include multiple portions that are physically separated from one another, including but not limited to separate floors, rooms, buildings, and/or portions divided in any other suitable manner. Mobile drive units 20 may be configured to utilize alternative conveyance equipment such as vertical or horizontal conveyors, trucks, ferries, gondolas, escalators, and/or other appropriate equipment suitable to convey mobile drive units 20 between separate portions of workspace 70.

Queue 80 may include a plurality of queue spaces that represent portions of workspace 70 associated with inventory station 54 into which inventory holders 30 may move or replace to await processing upon arrival at inventory station 54. Queue 80 may be divided into a plurality of rows in which groups 100 of connected inventory holders 30 arranged in chains, columns, or in single file may await processing at inventory station 54. The spaces of the queue 80 represent an area in which one or more mobile drive units 20, inventory holders 30 and/or groups 100 of connected inventory holders 30 wait until the associated inventory station 54 is ready to process a request or perform other tasks associated with the relevant component. In particular embodiments, a particular queue 80 may have a fixed number of queue spaces or queue rows. In some embodiments, a particular queue 80 may have a variable number of queue spaces and/or rows determined based on the types of tasks to be completed at the associated inventory station 54, a traffic metric or the associated inventory station 54 whether or not that inventory station 54 is designated for processing groups 100 of inventory holders 30 and/or any other appropriate factors.

Vehicle 90 represents any appropriate vehicle that may be utilized to transport inventory holders 30 from one location to another. Vehicle 90 may represent a trailer, a box trailer, a flatbed truck, a train, a cargo shipment container, or any number of appropriate containers that are capable of being used to ship inventory holders. In some embodiments, trailer 90 may be equipped with a number of connection modules 34 at various points along the wall of the vehicle 90, such that the connection modules located on each inventory holder 30 may lock those inventory holders 30 or secure those inventory holders 30 in to place for shipment. Vehicle 90 may thus include an appropriate communication system operable to provide and/or transmit information to inventory system 10. For example, vehicle 90 may be capable of informing management module 15 of its arrival and/or that it is ready to be loaded and/or unloaded. Similarly, vehicle 90 may be capable of instructing inventory holders 30 in vehicle 90 to connect and/or disconnect from appropriate portions of vehicle 90 at appropriate times.

In operation, management module 15 may administer and coordinate various tasks within inventory system 10. Management module 15 may issue instructions to mobile drive units 20 to move individual inventory holders 30, to form groups 100 of connected inventory holders 30, and/or move groups 100 of connected inventory holders 30 from location to location within inventory system 10. For example, management module 15 may issue instructions to mobile drive units 20 to retrieve an inventory holder 30 and transport that inventory holder 30 to an inventory station 54. Management module 15 may determine to process an order at inventory station using a first inventory item 32 stored by one inventory holder and a second inventory item stored by another inventory holder. Management module 15 may select the first inventory holder and the second inventory holder for transportation to the inventory station 54. Management module 15 may facilitate the assembly and disassembly of groups 100 of connected inventory holders 30 by issuing instructions to mobile drive units 20. Management module 15 may instruct mobile drive unit 20 to connect one inventory holder 30 with a second inventory holder 30 into a group 100 and transport the group 100 of connected inventory holders 30 to inventory station 54. Group 100 may be formed at any appropriate location within inventory system 10, such as at inventory storage 48, shipping station 52, and/or inventory stations 54. In some embodiments, group 100 may be formed at an end of queue 80 for transportation to inventory station 54. Accordingly, mobile drive units 20 may manage a queue to inventory station 54 by assembling groups 100 of connected inventory holders 30, moving the groups 100 towards the inventory station 54 when appropriate, and removing inventory holders 30 from the group 100 after that inventory holder 30 has been processed at inventory station 54. In the illustrated embodiment, the two mobile drive units 20 docked at each end of group 100 may coordinate to transport group 100 through the queue to inventory stations 54. After a particular inventory holder 30 is processed at inventory station 54, it may be disconnected from group 100 and moved to another location within inventory system 10, such as an inventory storage area.

Management module 15 may determine whether that inventory holder 30 should be formed into a group 100 of connected inventory holders 30 while waiting in queue 80 of inventory station 54. As noted above, this decision may be based on the processing and/or throughput requirements of that inventory station 54 and/or the volume of orders and/or items outstanding. If that inventory holder 30 is selected for a group 100 of connected inventory holders, management module 15 may instruct mobile drive unit 20 to form a group with two or more inventory holders 30 waiting in queue 80 to inventory station 54. Various groups 100 of connected inventory holders 30 may await processing in queue 80 to inventory station 54. Mobile drive units 20 may manage queue 80 by moving up various rows as appropriate and by moving groups 100 along inventory station 54 laterally until they reach a processing location. The processing location may be one or more locations at which items are removed from inventory holders 30 for processing. After an inventory holder 30 is processed, the row may be moved so that the next inventory holder 30 in the row can be processed. Once a particular row of inventory holders 30 has been processed, mobile drive units 20 may move another group 100 of inventory holders into that row and then successively move up the rows of inventory holders in queue 80. Management module 15, once a last row becomes available, may select another set of inventory holders 30 to form a group 100 within the last row of queue 80. A more detailed description of how mobile drive units 20 may be used to manage a queue of groups 100 of connected inventory holders 30 is described below with respect to FIGS. 6A-6G.

As orders are processed at inventory station 54, containers holding completed orders may be placed onto inventory holder 30 stationed at inventory station 54 and/or designated for receiving completed orders. Once such an inventory holder 30 has received and/or been filled with containers of completed orders, mobile drive unit 20 may be instructed to transport inventory holder 30 to shipping station 52 for shipment. Management module 15 may determine to form groups 100 of connected inventory holders 30 at shipping station 52. Management module 15 may form groups 100 based on any appropriate factors including the time at which those orders are scheduled to be shipped and/or the time at which a delivery vehicle 90 is expected to arrive and/or by which deliver vehicle inventory holders 30 are expected to be shipped on. Based on such factors management module 15 may select inventory holders 30 to be formed into groups 100 at shipping station 52. Management module 15 may issue appropriate instructions to mobile drive units 20 to assemble and/or form groups 100 of connected inventory holders 30. Once formed management module 15 may wait until a trigger event is detected. For example, an appropriate event may be the occurrence of a scheduled shipping time, the arrival of a delivery truck, and/or any other appropriate trigger event. Once that trigger event is detected, management module 15 may instruct mobile drive units 20 to move groups 100 of inventory holders 30 onto the appropriate vehicle 90. Vehicle 90 may include portions to which connection modules 34 may connect. In some embodiments, vehicles 90 may include connection modules 34. A more detailed description of loading a vehicle 90 using connected group 100 is discussed below with respect to FIGS. 7D-7F.

From time to time, shipments of new inventory items 32 may arrive in vehicles 90 at receiving station 52. Those shipments may include groups 100 of connected inventory holders received from a remote location. Mobile drive units 20 may then unload those groups 100 from vehicles 90. Mobile drive units 20, may for example, form a communications session with the inventory holders 30 in group 100, and issue appropriate disconnect instructions such as releasing one or more clamping mechanisms and/or braking mechanisms of inventory holders 30 in group 100. Once unloaded from vehicle 90, groups 100 may be disassembled, disconnected and inventory items 32 from those inventory holders may be processed and/or entered into inventory system 10 and/or those inventory holders 30 may be placed into circulation. For example, those inventory holders 30 may be moved into inventory storage areas 48 and/or used to fulfill orders as appropriate within inventory system 10. Replacement inventory items 32 may be received to be placed into inventory holders 30 that are low or are depleted of inventory items. Replenished inventory holders 30 which may be then transported back into inventory storage 48 and/or moved to inventory station 54 to be processed into orders.

As another example of the use of groups 100 of connected inventory holders 30, management module 15 may determine to transport large groups of inventory items 30 from one place to another within inventory system 10. For example, low volume and/or unpopular or unused inventory items 32 may typically be stored further away from inventory station 54 while relatively more popular and/or high volume items may be stored relatively closer to inventory station 54. In particular situations, inventory item 32 may be low in popularity at a particular time but be expected to rise drastically in popularity at some point in the near future. Accordingly, for example, in anticipation of a popular movie being released on DVD or an expected best selling book being released, an example inventory system 10 may store large quantities of that inventory item 32. Because the release date has not occurred, however, those inventory items 32 may have a relatively low product velocity and/or a product velocity of zero. Accordingly, management module 15 may determine to store such inventory items relatively far away from inventory station 10. Accordingly, management module 15 may, in response to a trigger event, such as the occurrence of a scheduled release date or a date designated for preparation of the scheduled release date, management module 15 may determine to move that group of inventory items 32 closer to inventory station 54. Accordingly, management module 15 may determine to assemble a large group 100 of inventory holders 30 storing that inventory item 32 so that those items can be moved in bulk. The large group 100 may be arranged in any appropriate grid, using for example, any of the arrangements discussed above. It should be noted, however, that while a specific example of a bulk move is provided, the teachings of the present disclosure apply to any situation that is appropriate for inventory system 10 to move inventory holders 30 in bulk.

In some embodiments, management module 15 may be capable of planning paths and/or reserving portions of paths for inventory items 32 that are irregularly shaped and/or do not fit within the footprint of inventory holder 30. For example, a kayak, lumber, or other irregular object may be too long for a particular inventory holder 30. Accordingly, such items may take up the space normally required by several inventory holders 30. In such cases, management module 15 may designate that item as a virtual group 100 of inventory holders 30 and/or may plan paths and reserve space for that inventory item as if it was a group 100 of inventory holders 30. For example, a kayak that takes up the length of three inventory holders 30 may be treated as a group 100 of three inventory holders 30 arranged in a column.

FIGS. 6A-6G are block diagrams illustrating an example method of operating an inventory stations 54 using connected inventory holders. In particular, FIGS. 6A-6G illustrate a method of managing a queue of groups 100 of connected inventory holders 30. In general, mobile drive units 20 manage queue 80 of inventory holders 30 connected into various groups 100 of inventory holders 30. As inventory items 32 are processed from an inventory holder 30 in a group 100 at a processing location adjacent to or at inventory station 54, mobile drive units remove that processed inventory holder 30 from group 100, move the inventory holder 30 away from the queue 80. The group 100 is then moved so that another inventory holder 30 is positioned at the processing location of inventory station 54. After a group 100 in a row is processed and those inventory holders 30 in group 100 are removed from the queue, another group 100 may be moved to the row. Consequently, other groups 100 may also move up a row. Accordingly, queue 80 may be managed by mobile drive units 20 to move groups 100 through the queue 80.

FIG. 6A illustrates groups 100a to 100n of connected inventory holders 30 waiting in queue 80 to inventory station 54. As illustrated, each group 100 in the queue 80 is positioned in a row of the queue 80. In the illustrated embodiment, the inventory holder 30 in row A at position 1 is at a processing location of inventory station 54. Inventory station 54 may select inventory items 32 from inventory holder 30 at position 1, which may be used to fill an order that includes a request for those inventory items 32.

FIG. 6B illustrates that once the inventory holder 30 in position 1 of row A is processed, mobile drive units 20a and 20b move group 100a by the length of one inventory holder 30 to the left so that the second inventory holder 30 in row 100a is positioned at the processing location of inventory station 54.

FIG. 6C illustrates that once the second inventory holder 30 in group 100a is processed, mobile drive units 20a and 20b again move group 100a by the length of one inventory holder to the left so that the third inventory holder 30 in group 100a is positioned at the processing location of inventory station 54. At that time, mobile drive unit 20a may undock from the first inventory holder 30 in group 100a and move to the second inventory holder 30 in group 100a. Another mobile drive unit 20c may move beneath the first inventory holder 30, dock with the inventory holder 30, and/or instruct the inventory holder 30 to disconnect from group 100a. The first inventory holder 30 may thus be removed from the group 100a by mobile drive unit 20c and/or removed from queue 80. Mobile drive unit 20c may then move the first inventory holder 30 to another location within inventory system 10. For example, mobile drive unit 20c may move the first inventory holder 30 to a shipping station 52 to be replenished with new inventory items 32 and/or moved to inventory storage 48.

FIGS. 6D and 6E illustrate that mobile drive units 20a and 20b may continue moving group 100a along inventory station 54 until all of the inventory holders in group 100a are processed and removed from the queue. Once those inventory holders are in group 100a have been processed and/or removed from queue 80, mobile drive units 20d and 20e may move group 100b into the first row of queue 80. Mobile drive units 20d and 20e may then begin moving group 100b through queue 80 in a similar or the same manner as discussed above with respect to group 100a. Moreover, because group 100a has been disassembled, mobile drive units 20a and 20b may then move to positions beneath the first and last inventory holders 30 in group 100c.

FIGS. 6F and 6G illustrate that mobile drive units 20a and 20b may then move each successive group 100c to group 100n up in the queue 80 to the next successive row. Accordingly, any number 'n' of groups 100 may be positioned in queue 80 and be managed by mobile drive units 20a-20e. Once the last row in queue 80 is vacated, management module 15 may select additional inventory holders 30 for processing and/or may instruct one or more other mobile drive units 20 to assemble another group 100 of connected inventory holders 30 in the queue. Thus, large numbers of inventory holders 30 may await processing in queue 80 and may be managed by a fewer number of mobile drive units 20 than if each mobile drive unit 20 moved individual inventory holders 30 through queue 80. It should be noted that it is fully within the scope of the present disclosure for one mobile drive unit to move each group 100 as opposed to two in the illustrated embodiment. Moreover, while groups 100 are shown as being arranged in rows that move laterally with respect to inventory station 54, groups 100 may additionally or alternatively be arranged in rows that move directly towards inventory station 54. In such a configuration, an inventory holder 30 having been processed at inventory station 54 may be disconnected and removed from group 100 while in the processing location at inventory station 54. Then, group 100 would be moved towards inventory station 54 by the length of one inventory holder 30. After each group 100 is processed, successive groups 100 may then move laterally into position in front of inventory station 54. It should be noted that while queue 80 is illustrated in association with inventory station 54, queues 80 may be utilized at any appropriate location and/or station 50 within inventory system 10. For example, queues 80 may be utilized at shipping stations 50 to facilitate loading and/or unloading groups 100 of inventory holders 30. It should also be understood that while illustrated as including a single inventory station 54, inventory system 10 may include any number of appropriate inventory stations 54. In some embodiments, a particular queue 80 may serve more than one inventory station 54 and/or inventory station 54 may include more than one processing location. For example, various processing locations may be arranged in parallel with the first row of queue 80. It should also be noted that in some embodiments, a processing location of inventory station 54 may include a portion to which inventory holders 30 can connect and/or may include appropriate connection modules 34. Accordingly, inventory holders 30 may be capable of connecting to inventory station 54 for processing.

FIGS. 7A-7F are block diagrams illustrating an example method of operating a shipping station 52 using connected inventory holders 30. FIGS. 7A-7F illustrate an example shipping station 52 in which completed orders are shipped and new deliveries of inventory items 32 are received. As illustrated, the inventory system 10 includes a vehicle 90 that includes a delivery of groups 100 of connected inventory holders 30. In general, groups 100 of connected inventory holders 30 are moved off of vehicle 90 and placed into shipping station 52. Those inventory holders 30 may be used to replenish other depleted inventory holders 30 within inventory system 10 and/or moved into inventory storage 48. Inventory holders 30 storing completed orders of inventory items 32 may be formed into groups 100 and/or placed into vehicle 90 once that vehicle is ready and available to receive the readied shipments. It should be noted that while a single vehicle 90 is being illustrated as being loaded and unloaded, teachings of the present disclosure are intended to encompass loading and unloading any number of appropriate vehicles 90 and/or may include embodiments that in which vehicles 90 unload, leave, a different vehicle 90 replaces it, and then that new vehicle 90 is loaded. In addition, loading and unloading activities may occur with different vehicles that may be located at different shipping stations 52. For example, one shipping station 52 may be designated for loading while another shipping station 52 is designated for unloading.

FIG. 7A illustrates a vehicle 90 at shipping station 52 that includes groups 100b of connected inventory holders 30. In some embodiments group 100b represents a single large group 100 of connected inventory holders 30, in which inventory holders 30 may be connected during shipment. Shipping station 52 may additionally or alternatively include various groups 100a of inventory holders 30 that are ready to be shipped.

FIG. 7B illustrates that mobile drive units 20a and 20b may move into vehicle 90 to dock with appropriate inventory holders 30 in a group 100b. Meanwhile mobile drive units 20c and 20d may move into vehicle 90 to dock with appropriate inventory holders 30 in another group 100b. Mobile drive units 20a and 20b may disconnect a group 100b of inventory holders 30 from vehicle 90. For example, mobile drive units 20a and 20b may be instructed to remove a one inventory holder by four inventory holder groups 100 from the vehicle 90. Those inventory holders 30 may be connected to the adjacent inventory holders 30 in vehicle 90. In addition or in the alternative, those inventory holders 30 may be connected to connection modules 34 and or to structural portions of vehicle 90. For example, particular vehicles 90 may be equipped with connection modules 34 at appropriate locations in vehicle 90, such that once inventory holders 30 are moved into position in vehicle 90, they may connect to those connection modules 34 and thereby be secured into position for shipment. As another example, vehicles 90 may be equipped with appropriate structural elements such as struts, bars, or other support members to which connection modules 34 may hook, clamp, latch, or otherwise connect to. Mobile drive units may be capable of disconnecting sub-groups from a larger group of inventory holders by communicating appropriate commands through the connection modules 34 within that group 100. Accordingly, mobile drive units 20a and 20b may disconnect a subgroup 100 of inventory holders 30 from group 100b. Likewise, mobile drive units 20c and 20d may disconnect a group 100. Those groups 100b may then be moved off of vehicle 90 into shipping station 52.

As illustrated, mobile drive units 20a and/or 20b communicate an instruction for the inventory holders 30 in the group 100 being disconnected to disconnect from their adjacent connections. For example, as illustrated, inventory holder 30 over mobile drive unit 20a may disconnect from the inventory holder 30 that is immediately above and to the sides of that inventory holder 30. Each of the inventory holders 30 in that group from 20a to 20b would disconnect from the inventory holders to their sides as well and disconnect from the vehicle 90. Accordingly, the subgroup 100 formed by mobile drive units 20a will be moved off the trailer and placed into the shipping station 52, as well as the group formed by mobile drive units 20C and 20D.

FIG. 7C illustrates that the mobile drive units 20 may continue to remove groups 100b of inventory holders 30 from vehicle 90 until vehicle 90 is unloaded. Groups 100b of inventory holders 30 may be removed in a similar fashion as discussed above with respect to FIGS. 7A and 7B.

FIGS. 7D-7F illustrate the process of mobile drive units 20 loading a vehicle 90 for shipment. As illustrated, each group 100a of inventory holders may be moved into vehicle 90 and locked and/or secured into place using connection modules 34. Mobile drive units 20a and 20b move a first group 100 into vehicle 90 and may align connection modules 34 mounted on one or more sides of inventory holders 30 with connection modules 34 or other connection points within vehicle 90. The connection modules 34 or other connection points in vehicle 90 may be mounted on one or more interior walls at heights and spacing appropriate for connecting to connection modules 34. Once mobile drive units 20 receive an appropriate signal from one or more connection modules 34 in group 100 indicating that connection modules 34 are aligned, one or more of mobile drive units 20a and 20b may instruct those connection modules 34 to actuate their respective connection elements and connect to one or more of the sides of vehicle 90. As additional groups 100 are loaded into vehicle 90, connection modules 34 in those groups 100 may be instructed to connect to sides of vehicle 90 and/or to other inventory holders 30 that have already been loaded. Thus, groups 100 of connected inventory holders 30 may be connected together in vehicle 90 to form a larger group 100. In some embodiments, that larger group 100 may include inventory holders 30 along its exterior edges that may be connected to multiple walls of vehicle 90. For example, larger group 100 may be connected to any appropriate number of interior walls such as one to four of the interior walls. It should also be noted that while a particular vehicle 90 is illustrated having a particular geometry, any appropriate geometry may be used. Vehicle 90 may, for example, include multiple levels and/or sub-compartments and/or may have multiple interior walls to which groups 100 of inventory holders 30 may connect. In some embodiments, some vehicles 90 may not be configured to transporting groups 100 of inventory holders 30. Management module 15 may thus be capable of determining whether to form groups 100 of connected inventory holders 30 based on whether a particular vehicle 90 on which those inventory holders 30 are scheduled and/or determined to be shipped is capable of receiving groups 100 of inventory holders 30. In such instances, management module 15 may determine to use other shipping containers or methods. Once groups 100 of inventory holders are moved into vehicle 90 and secured and/or locked into place, vehicle 90 may be shipped to a remote location.

Figure 8:
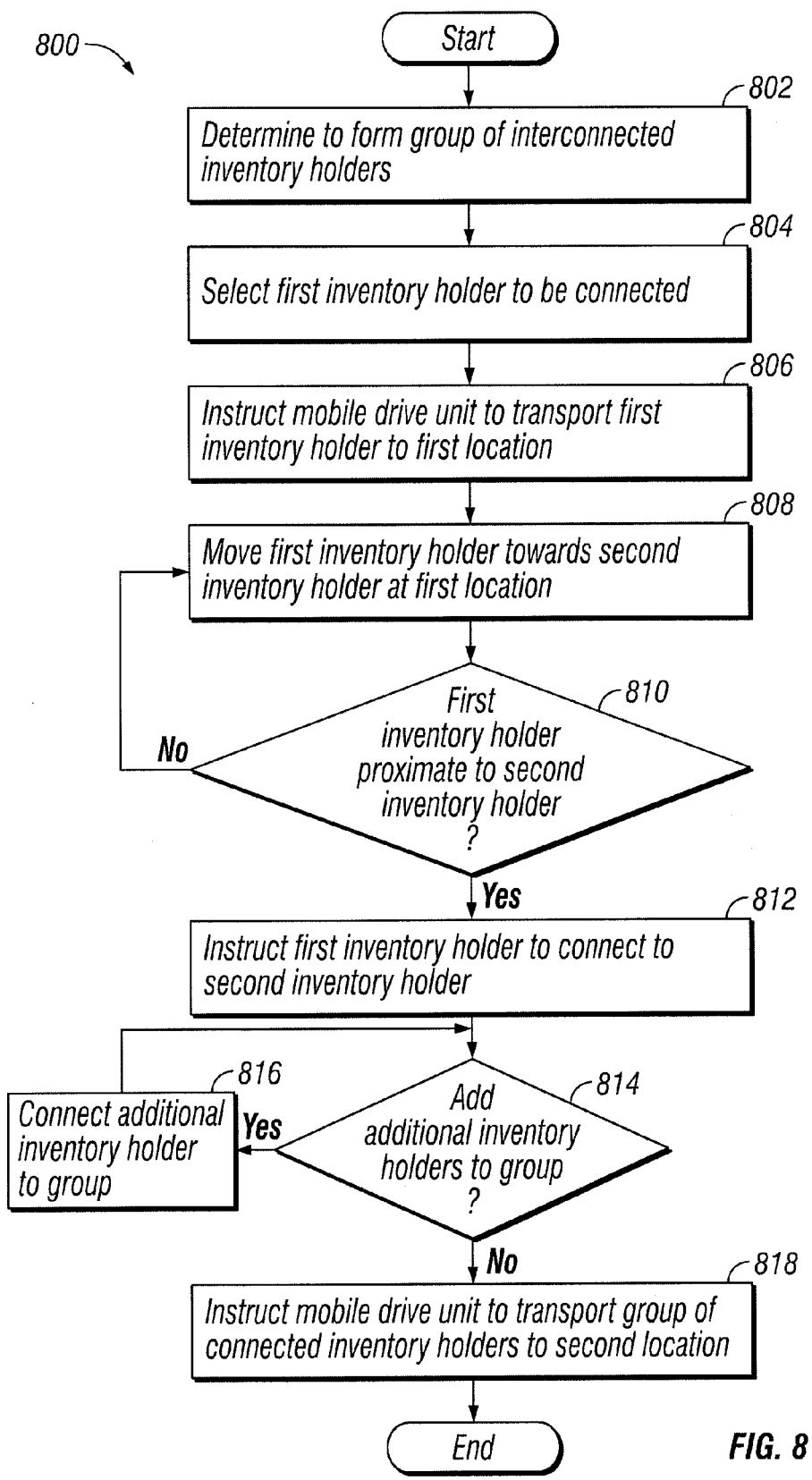
FIG. 8 is a flowchart illustrating an example method for operating an inventory system with connected inventory holders.

FIG. 8 is a flowchart illustrating an example method 800 for operating an inventory system 10 with connected inventory holders. Method 800 begins at step 802 at which management module 15 determines to form a group 100 of connected inventory holders 30. For example, management module 15 may determine to form a group 100 in order to move a bulk amount of inventory items 32 stored in multiple inventory holders 30 from one location to another location. Management module 15 may determine to much such inventory in response to an appropriate trigger event. For instance, a product may be expected to have a large increase in popularity and/or product velocity such as a new item being released for sale, or an item being offered for discounted prices, seasonal items coming into season, or any other appropriate factor that may indicate an increase in an inventory items velocity and/or rate of being ordered. As another example, management module 15 may determine to form a group 100 to occupy a row of queue 80 to await processing at inventory station 54, to await loading of a vehicle 90 at a shipping station 52, to move inventory holders 30 in bulk, and/or for any other appropriate purpose.

At step 804, management module 15 may select a first inventory holder 30 to be connected with another inventory holder 30 to form group 100. Inventory holders 30 may be selected for groups 100 based on appropriate factors, such as those discussed above. For example, inventory holders 30 may be selected for groups 100 at queues 80 based on those inventory holders 30 storing inventory items 32 that are requested for processing at inventory stations 54 and/or are requested to fill orders. Inventory holders 30 may also be selected for groups 100 based on determining to ship those inventory holders 30 at shipping stations 52 in vehicles 90 capable of transporting groups 100 of connected inventory holders 30. Inventory holders 30 may also be selected based on determining that those inventory holders 30 store inventory items 32 that have and/or are expected to increase in product velocity, so that those inventory holders 30 may be moved closer to inventory station 54 for processing. Management module 15 may also determine to move inventory holders 30 containing inventory items 32 that have decreased in popularity and/or velocity further away from inventory station 54.

At step 806, management module 15 may then instruct mobile drive units 20 to transport the first inventory holder 30 to a first location. For example, management module 15 may instruct the mobile drive unit 20 to transport the inventory holder 30 to queue 80, shipping station 52, or any other appropriate location within inventory system 10. The first location may be the location of a group 100 of inventory holders that have already been formed to which the first inventory holder 30 is to be added and/or the location of a second inventory holder to which first inventory holder will be connected to form group 100 at the first location. When mobile drive unit 20 docks with first inventory holder 30, mobile drive unit 20 may establish a communications session with connection module 34 of inventory holder 30. The communications session may be utilized to determine status information regarding the connection module 34 and/or control its connection elements. Mobile drive unit 20 may also be capable of receiving proximity information from connection module 34 regarding a proximity of a second inventory holder 30 to be connected to first inventory holder 30.

At step 808, mobile drive unit 20 may move the first inventory holder 30 towards the second inventory holder 30 at the first location. Second inventory holder 30 may be the end of a chain of a group 100 of inventory holders 30 to which the first inventory holder 30 is being added and/or may be an individual inventory holder 30 to which the group 100 is being formed. At step 810, Mobile drive unit 20 may continue to move the first inventory holder 30 towards the second inventory holder 30 until it is in proximity to the second inventory holder 30. For example, mobile drive unit 20 may receive proximity information from connection module 34 of first inventory holder 30 regarding the proximity of second inventory holder 30. In response to proximity information indicating a proximity of second inventory holder 30, mobile drive unit 20 may take appropriate actions such as slowing down and/or stopping. Mobile drive unit 20 may, for example, utilize an appropriate control loop or other logic based control to gradually slow down as mobile drive unit 20 nears second inventory holder 30. This may facilitate ensuring that the inventory holders 30 come into proximity and/or contact without causing a collision between the two inventory holders 30 and/or bumping into each other at a rate of speed that is above an amount calculated to be too high.

Once the first inventory holder 30 has closed to within a predetermined distance to the second inventory holder 30 and/or is in contact with the second inventory holder, mobile drive unit may, at step 812, instruct first inventory holder 30 to connect to second inventory holder 30. For example, mobile drive unit may receive a signal or other information from sensor 208 of connection module 200 indicating that the first inventory holder 30 is within a predetermined distance to and/or is in contact with the second inventory holder 30. In response to receiving such an indication, mobile drive unit 20 instructs first inventory holder 30 to connect second inventory holder 30. In some embodiments, mobile drive unit 20 may communicate an activation signal or other information to connection module 34 of first inventory holder 30 that causes it to engage its connection elements 202 onto a connection module 34 of second inventory holder 30. Additionally or alternatively, mobile drive unit 20 may establish a communications session with a second connection module 34 of the second inventory holder 30. Mobile drive unit 20 and/or the first connection module 34 may then instruct the second connection module 34 to connect its connection elements to the first connection module 34. Accordingly, first inventory holder 30 may establish a communications session with the second inventory holder's connection module 34, which may then instruct the connection elements of second inventory holder 30 to engage onto the connection elements of the connection module 34 of the first inventory holder 30. Thus, connecting inventory holders 30 may include interconnection of each inventory holder 30 onto the other.

At step 814, management module 15 may determine whether to add additional inventory holders to group 100. For example, management module 15 may determine to form a group 100 of any appropriate size and/or pattern. As another example, group 100 of inventory holders 30 may eventually decrease in size as it is processed at inventory station 54. Management module 15 may determine to add other inventory holders 30 to such a group 100. In some embodiments, management module 15 may determine to create a group 100 of a particular size in response to any of the factors discussed above regarding the capacity, weight, torque, and/or power capabilities of various mobile drive units 20. Management module 15 may also determine to change the size of one or more groups 100 in response to dynamic changes made to the length of queue 80. For example, management module 15 may dynamically adjust the length of queue 80 based on order backlogs and/or the throughput requirements inventory system 10 or any other appropriate factor. Management module 15 may make corresponding changes to the sizes of groups 100 in queue 80 and/or may determine not to form such groups 100 at all, instead determining to send individual inventory holders 30 transported by mobile drive units 20 through queue 890.

If any additional inventory holders are to be added to group 100, management module 15 may, at step 816, instruct mobile drive units 20 to connect additional inventory holders 30 to group 100. Once group 100 is at the desired size and/or configuration, management module 15 may instruct one or more mobile drive units 20 to transport group 100 of connected inventory holders 30 to a second location within inventory system 10. For example, management module 15 may instruct mobile drive units 20 to manage queue 80 associated with inventory station 54. Mobile drive units 20 may thus transport groups 100 of inventory holders 30 through queue 80 at inventory station 54. As another example, mobile drive units 20 may transport group 100 and move them onto a vehicle 90 for transportation to another facility or remote destination. After step 18 the method ends. Management module 15 may determine an appropriate number of mobile drive units 20 to transport group 100 based on its size, weight, power capabilities of mobile drive units, and/or other factors as discussed above. If for example, management module 15 assigns tasks for more than one mobile drive unit to transport a particular group 100, those mobile drive units 20 may coordinate to transport group 100 as discussed above. After mobile drive units 20 transports group 100 to the second location, method 800 ends.

Figure 9:
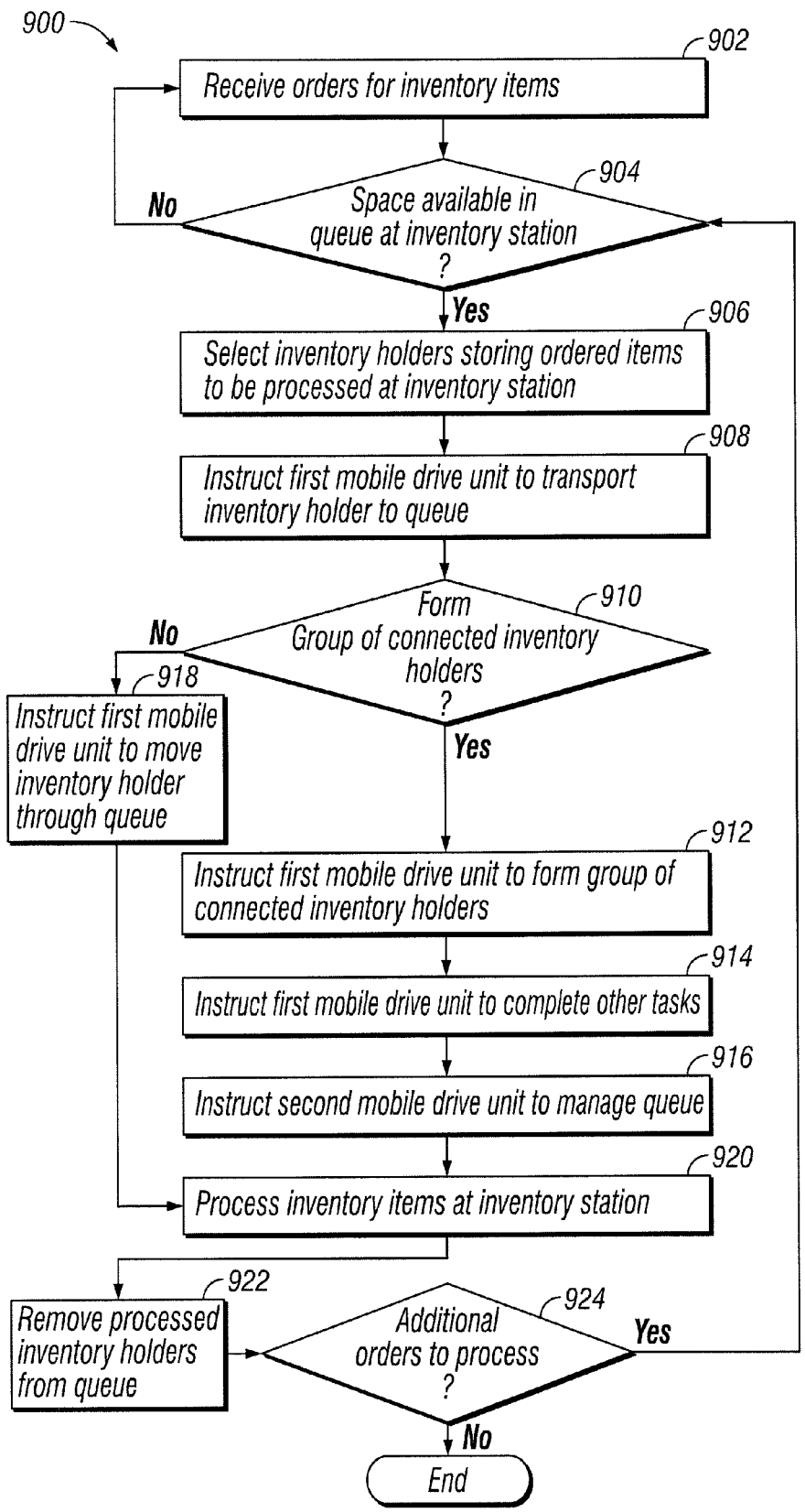
FIG. 9 is a flowchart illustrating an example method for operating an inventory system with connected inventory holders.

FIG. 9 is a flowchart illustrating an example method 900 for operating an inventory system 10 with connected inventory holders. Method 900 begins at step 902 at which management module 15 may receive various orders for inventory items 32. Management module 15 may determine to process those orders at inventory station 54. Accordingly, management module 15 may locate those inventory items 32 on the various orders as they are stored within the various inventory holders 30 in inventory storage 48. Management module may select those inventory holders that store those inventory items, and designate those inventory holders 30 to be processed at inventory station 54. Management module 15 may then select various mobile drive units to retrieve those inventory holders to transport them to queue 80 of inventory station 54, if space is available, at step 904.

If no space is available, management module 15 may determine to send those inventory holders 30 to a drift location or other intermediate location that is on its way to inventory station 54 and/or choose to wait to process those orders until a space becomes available. Additionally or alternatively, management module 15 may determine to increase the size of queue 80 if the number of orders and/or items to be processed is above a predetermined threshold.

At step 906, once space is available, management module 15 may select inventory holders 30 storing the desired inventory items 32 to be processed at inventory station 54. Management module 15 may then instruct mobile drive units 20 to transport those inventory holders 30 to inventory station 54 for processing.

At step 908, management module 15 may then instruct first mobile drive unit 20 to transport a selected inventory holder 30 to queue 80. In some embodiments, management module 15 may instruct multiple mobile drive units 20 to move multiple selected inventory holders 30 to queue 80. At step 910, management module 15 may determine whether to form groups 100 of connected inventory holders 30 at queue 80. For example, management module 15 may determine to form groups 100 if the size of queue 80 is above a predetermined threshold, if a selected inventory station 54 is designated to have a queue 80 with groups 100, or any other appropriate factor. As another example, management module 15 may determine to form a group 100 based on the throughput requirements of inventory station 54 and/or the volume of orders that need to be processed within inventory system 10 based on the particular capabilities of inventory station 54 and/or any other number and combination of appropriate factors. If, at step 910, management module 15 determines to form a group 100 of connected inventory holders, management module 15 may proceed to step 912.

At step 912, management module 15 determines to form one or more groups 100 of connected inventory holders, management module 15 may provide appropriate instructions to one or more first mobile drive units 20 to form those groups 100. For example, management module 15 may instruct first mobile drive units 20 to form multiple groups 100 that are formed into single file, columns, and/or chains of inventory holders 30. Those single file, columns, and/or chains of inventory holders 30 may each be configured and/or designated to occupy a particular row of queue 80. Those groups 100 may be formed using any of the techniques discussed above.

At steps 914 and 916, first mobile drive units 20 may be instructed to complete other tasks while second mobile drive units 20 are instructed to manage queue 80. For example, second mobile drive units 20 may be designated for managing queue 80 while first mobile drive units 20 are designated for transporting inventory holders 30 from inventory storage 48 to queue 80. Because groups 100 of connected inventory holders 30 need not have individual mobile drive units 20 for each inventory holder 30, fewer mobile drive units 20 may be required to manage queue 80. Thus, mobile drive units 20 transporting inventory holders 30 to queue 80 need not remain with that inventory holder 30 as it progresses through the queue. It should be noted, however, that certain of first mobile drive units 20 may remain to manage the queue 80 and/or management module 15 may change the second mobile drive units 20 designated to manage queue 80 as appropriate.

If management module 15 determines not to form groups 100, management module 15 may at step 918 instruct first mobile drive units 20 to move through queue 80 transporting individual inventory holders 30.

At step 920, inventory items 32 may be processed at one or more processing locations of inventory station 54. For example, the first inventory holder 30 in the queue may be processed and/or inventory items 32 may be removed from that inventory holder 30 and placed in an appropriate container associated with an order. As items are processed, second mobile drive units 20 may move groups 100 of connected inventory holders 30 through the queue 80. For example, second mobile drive units 20 may use similar techniques as discussed above with respect to FIG. 6. At step 922, processed inventory holders 30 may be removed from the queue 80 and/or their respective groups 100 and transported to other portions of inventory system 10. For example, an inventory holder 30 may be disconnected from group 100 and/or transported away by another mobile drive unit 20 to inventory storage 48.

As groups 100 are moved through queue 80 and inventory holders 30 are removed from queue 80 after processing, additional locations in queue 80 may become available. Management modules may then, at step 924, determine whether to process additional orders in queue 80. If there are more process orders in the queue to be processed at step 924, the method 800 may return to step 904 at which management module 15 may determine whether there is space available in queue 80 for those inventory holders 30 to be processed. After step 924, method 900 ends.

Figure 10:
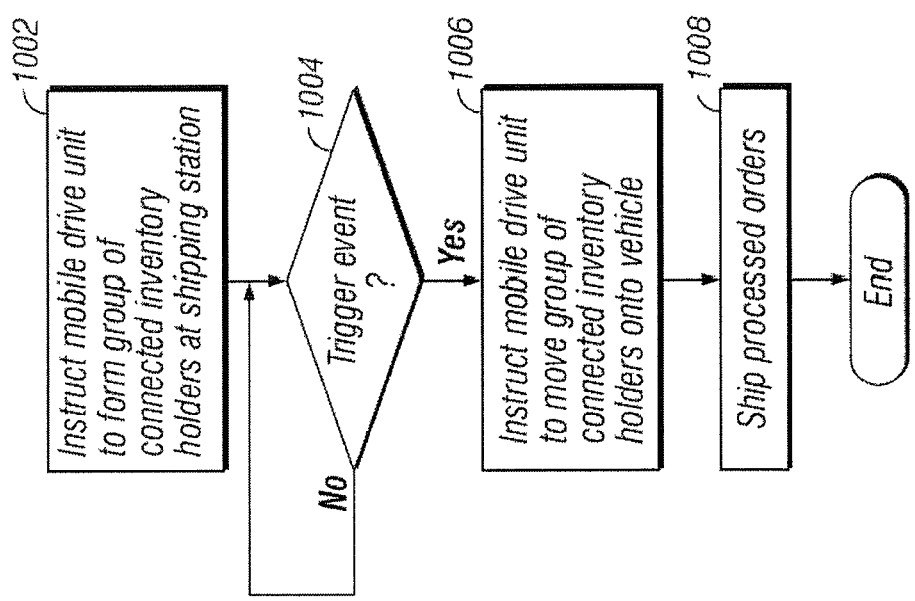
FIG. 10 is a flowchart illustrating an example method for operating an inventory system with connected inventory holders.

FIG. 10 is a flowchart illustrating an example method 1000 for operating an inventory system 10 with connected inventory holders 30. Method 1000 begins at step 1002 at which management module 15 may instruct mobile drive units to transport inventory holders 30 to shipping stations 52 for shipment. Those mobile drive units 20 may be instructed to form groups 100 of connected inventory holders 30 so that they may be placed on an appropriate vehicle 90 for shipment. Once those groups are formed, those groups 100 may await an appropriate trigger event to occur which may, for example, be a vehicle 90 becoming available for shipment and/or an appropriate scheduled shipping time to occur. Once that trigger event has occurred at step 1004, management module 15 may, at step 1006, instruct mobile drive units 20 to move groups 100 of connected inventory holder 30 onto vehicle 90 for shipment. For example, a given group 100 of inventory holders 30 may be arranged in a column. Management module 15 may instruct one mobile drive unit 20 to dock with inventory holder 30 at one end of the column and a second mobile drive unit to dock at the other end of the column. Management module 15 may then instruct the first mobile drive unit 20 and the second mobile drive unit 20 to transport the group 100 of inventory holders 30 onto the vehicle 90. Moreover, as described above, the movements of the first and second mobile drive units 30 may be coordinated. Vehicles 90 may be loaded using any of the techniques discussed above with respect to FIG. 7. At step 1008, those inventory holders 30 may be shipped. As noted above, vehicle 90 may include connection modules 200 to which those connected inventory holders may be attached and/or secured for shipment. After step 1008, the method ends.

Modifications, additions, or omissions may be made to method 700 illustrated in the flowcharts of FIGS. 8-10. For example, management module 15 may be capable of assigning many tasks at once and/or in parallel. Thus, management module 15 may also process many orders in parallel and/or in sequence. Moreover, management module 15 may be capable of fulfilling orders for any number and types of inventory facilities. Orders corresponding to various of those facilities may be processed by management module 15 sequentially and/or at the same time using various inventory stations 54. Additionally, the steps of FIGS. 8-10 may be performed in parallel or in any suitable order. Moreover, the embodiments described with respect to the present disclosure are expected be fully combinable and suitable for use in appropriate embodiments described herein.

Figure 11:
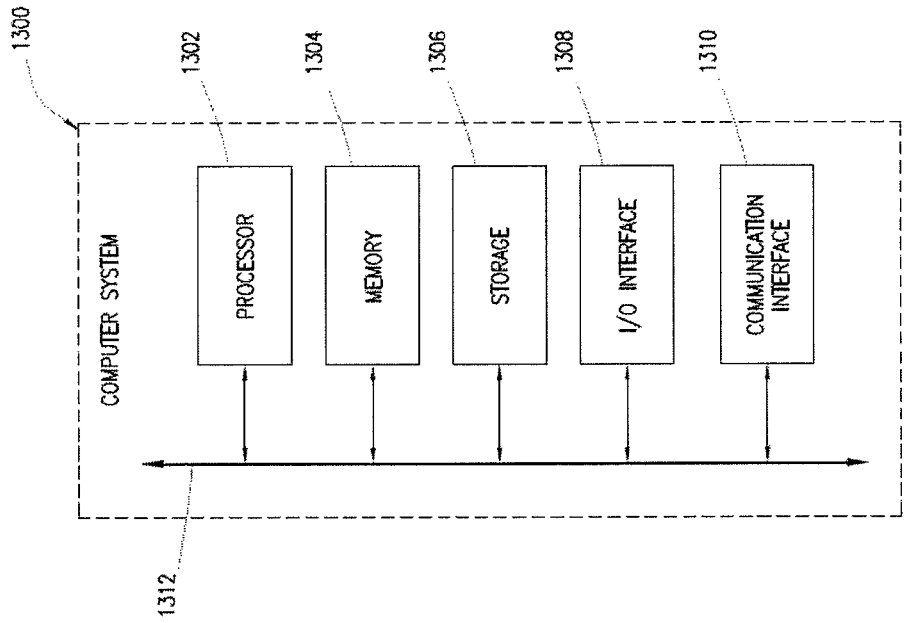
FIG. 11 is a block diagram illustrating an example computer system that may be used for one or more portions of the systems and methods disclosed herein.

FIG. 11 is a block diagram illustrating an example computer system 1300 that may be used for one or more portions of the systems and method disclosed herein. In particular embodiments, one or more computer systems 1300 perform one or more steps of one or more methods described or illustrated herein. In particular embodiments, one or more computer systems 1300 provide functionality described or illustrated herein, such as, for example, any appropriate component of system 10, such as management module 15 and/or mobile drive unit 20. In particular embodiments, software running on one or more computer systems 1300 performs one or more steps of one or more methods described or illustrated herein or provides functionality described or illustrated herein. Particular embodiments include one or more portions of one or more computer systems 1300.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple datacenters; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. Although this disclosure describes and illustrates a particular processor, this disclosure contemplates any suitable processor.

In particular embodiments, memory 1304 includes main memory for storing instructions for processor 1302 to execute or data for processor 1302 to operate on. In certain embodiments, memory 1304 may be memory includes in any of the system 10 components discussed above, such as management module 15 and/or mobile drive units 20. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. Although this disclosure describes and illustrates particular memory, this disclosure contemplates any suitable memory.

In particular embodiments, storage 1306 includes mass storage for data or instructions. In certain embodiments, storage 1306 may be included in any appropriate component of system 10, including management module 15 and/or mobile drive units 20. Storage 1306 may include removable or non-removable (i.e., fixed) media, where appropriate. Storage 1306 may be internal or external to computer system 1300, where appropriate. In particular embodiments, storage 1306 is non-volatile, solid-state memory. Where appropriate, storage 1306 may include one or more storages 1006. Although this disclosure describes and illustrates particular storage, this disclosure contemplates any suitable storage.

In particular embodiments, I/O interface 1308 includes hardware, software, or both providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate.

Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 1310 for it. Although this disclosure describes and illustrates a particular communication interface, this disclosure contemplates any suitable communication interface.

In particular embodiments, bus 1312 includes hardware, software, or both coupling components of computer system 1300 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1302 (such as, for example, one or more internal registers or caches), one or more portions of memory 1304, one or more portions of storage 1306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While particular embodiments of inventory system 10 are illustrated, it should be appreciated that the teaching of the present disclosure may be applied to any type and number of inventory systems. For example, inventory system 10 may represent a merchandise-return facility. In such an embodiment, inventory items may represent merchandise returned by customers. Units of these inventory items may be stored in inventory holders 30 when received at the facility. At appropriate times, a large number of units may be removed from a particular inventory holder 30 and packed for shipment back to a warehouse or other facility. In some embodiments, inventory system 10 may include a global-positioning system (GPS) by which the location of the various components of system 10 are tracked by management module 15. In such embodiments, connection module 34 may include a GPS device operable to report location information to management module 15 and/or mobile drive units 20.

As yet another example, inventory system 10 may represent a manufacturing facility with inventory items 32 representing individual components of a manufacturing kit to be included in an assembled product, such as electronic components for a customized computer system. In such an embodiment, inventory system 10 may retrieve particular components identified by a specification associated with an order for the product so that a customized version of the product can be built. Although a number of example embodiments are described, inventory system 10 may, in general, represent any suitable facility or system for storing and processing inventory items. Similarly, inventory items 32 may represent objects of any type suitable for storage, retrieval, and/or processing in a particular inventory system 10.

Additionally, management module 15 may represent a single component, multiple components located at a central location within inventory system 10, and/or multiple components distributed throughout inventory system 10. For example, management module 15 may represent components of one or more mobile drive units 20 that are capable of communicating information between the mobile drive units 20 and coordinating movement of mobile drive units 20 in transporting inventory holders 30. In general, management module 15 may include any appropriate combination of hardware and/or software suitable to provide the described functionality and may further include components located on mobile drive units 20, stations 50, or other elements of inventory system 10.

Furthermore, as noted above, management module 15 may include components of individual mobile drive units 20. Thus, for the purposes of this description, communication between management module 15 and a particular mobile drive unit 20 may represent communication between components of a particular mobile drive unit 20. In general, mobile drive units 20 may be powered, controlled, and propelled in any manner appropriate based on the configuration and characteristics of inventory system 10.

It should also be noted that the various components of inventory system 10 complete various operations involving inventory items 32 and/or the components of inventory system 10 themselves. Management module 15 manages the operation of components and the use of various system resources to facilitate the fulfillment of these tasks. Although the description above focuses on various embodiments of inventory system 10 capable of performing specific operations, a particular embodiment of inventory system 10 may be configured to perform any appropriate operations associated with the storage, processing, transport, or removal of inventory items 32.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. A system, comprising:
   an inventory station comprising:
      a processing location; and
      a queue having at least a first row and a second row;
   a first group of physically connected inventory holders comprising the first row of the queue, wherein a first inventory holder in the first group is located at the processing location;
   a second group of physically connected inventory holders comprising the second row of the queue; and
   a first mobile drive unit operable to:
      dock with one of the inventory holders in the first group of physically connected inventory holders;
      after a first inventory holder is processed at the inventory station, move the first group of physically connected inventory holders such that a second inventory holder in the first group of physically connected inventory holders is moved to the processing location;
      cause the first inventory holder to disconnect from the first group of inventory holders, wherein the first inventory holder is transported from the queue to a storage location; and
   a second mobile drive unit operable to:
      dock with a third inventory holder in the second group of physically connected inventory holders; and
      after the first group of physically connected inventory holders is processed at the processing location, move the second group of physically connected inventory holders to the first row of the queue while docked with the third inventory holder.

2. The system of claim 1, wherein the queue includes a last row and the system further includes a third mobile drive unit operable to assemble a third group of physically connected inventory holders at the last row of the queue.

3. A system, comprising:
   an inventory station comprising:
      a processing location; and
      a queue having at least a first row and a second row;
   a first group of connected inventory holders comprising the first row of the queue, wherein a first inventory holder in the first group is located at the processing location;
   a second group of connected inventory holders comprising the second row of the queue; and
   a first mobile drive unit operable to:
      dock with one of the inventory holders in the first group of connected inventory holders;
      after a first inventory holder is processed at the inventory station, move the first group of connected inventory holders such that a second inventory holder in the first group of connected inventory holders is moved to the processing location;
      cause the first inventory holder to disconnect from the first group of inventory holders, wherein the first inventory holder is transported from the queue to a storage location; and
   a second mobile drive unit operable to:
      dock with a third inventory holder in the second group of connected inventory holders;
   after the first group of connected inventory holders is processed at the processing location, move the second group of connected inventory holders to the first row of the queue while docked with the third inventory holder; and
   wherein the first group of connected inventory holders includes at least the first inventory holder, the second inventory holder, and a fourth inventory holder, wherein the first group of connected inventory holders are connected to each other by a plurality of actuatable clamping elements.

4. A system, comprising:
   an inventory station comprising:
      a processing location; and
      a queue having at least a first row and a second row;
   a first group of connected inventory holders comprising the first row of the queue, wherein a first inventory holder in the first group is located at the processing location;
   a second group of connected inventory holders comprising the second row of the queue; and
   a first mobile drive unit operable to:
      dock with one of the inventory holders in the first group of connected inventory holders;
      after a first inventory holder is processed at the inventory station, move the first group of connected inventory holders such that a second inventory holder in the first group of connected inventory holders is moved to the processing location;

cause the first inventory holder to disconnect from the first group of inventory holders, wherein the first inventory holder is transported from the queue to a storage location; and a second mobile drive unit operable to:
dock with a third inventory holder in the second group of connected inventory holders;
after the first group of connected inventory holders is processed at the processing location, move the second group of connected inventory holders to the first row of the queue while docked with the third inventory holder; and wherein the first mobile drive unit is further operable to form the first group of connected inventory holders by:
docking with the first inventory holder;
establishing a communication session with a first connection module of the first inventory holder, the first connection module comprising at least one first clamping element;
moving the first inventory holder into proximity to the second inventory holder, wherein the first connection module of the first inventory holder is aligned with a second connection module of the second inventory holder; and
activating the first connection module to clamp the at least one first clamping element onto the second connection module.

5. The system of claim 4, wherein the second connection module comprises at least one second clamping element and the first mobile drive unit is further operable to form the first group of connected inventory holders by:
establishing a communication session with the second connection module;
activating the second connection module to clamp the at least one second clamping element onto the first connection module.

6. A system comprising:
a station comprising a queue having a first row and a second row;
a management module operable to:
instruct a first mobile drive unit to move a first group of physically connected item holders from the second row to the first row;
instruct the first mobile drive unit to move the first group of physically connected item holders along the station such that one or more items stored by the first group of physically connected item holders are processed at the station; and
after the one or more items from the first group of items are processed, instruct a second mobile drive unit to move a second group of physically connected item holders from the second row to the first row.

7. The system of claim 6, wherein the first group of physically connected item holders comprises at least three item holders and the first mobile drive unit coordinates with a third mobile drive unit to move the first group of physically connected item holders.

8. The system of claim 6, wherein the first group of physically connected item holders comprises a first item holder and a second item holder and the management module is operable to instruct the first mobile drive unit to move the first group of physically connected item holders along the station by:
instructing the first mobile drive unit to dock with the first item holder;
instructing the first mobile drive unit to move the first group of physically connected item holders such that the first item holder is aligned with a processing location at the station, wherein one or more items are processed from the first item holder while the first item holder is aligned with the processing location; and
instructing the first mobile drive unit to move the first group of physically connected item holders such that the second item holder is aligned with the processing location.

9. The system of claim 8, wherein the management module is further operable to:
after the one or more items are processed from the first item holder, instruct the first mobile drive unit to disconnect the first item holder from the first group of physically connected item holders; and
instruct a third mobile drive unit to transport the first item holder to a storage location.

10. A system comprising:
a station comprising a queue having a first row and a second row;
a management module operable to:
instruct a first mobile drive unit to move a first group of connected item holders from the second row to the first row;
instruct the first mobile drive unit to move the first group of connected item holders along the station such that one or more items stored by the first group of connected item holders are processed at the station;
after the one or more items from the first group of items are processed, instruct a second mobile drive unit to move a second group of connected item holders from the second row to the first row; and
wherein the first group of connected item holders comprises a first item holder and a second item holder that are connected to each other by a plurality of connection elements that are actuatable by the first mobile drive unit.

11. The system of claim 10, wherein the first item holder includes a sensor operable to indicate to the first mobile drive unit a proximity of the second item holder, and the first mobile drive unit is operable to actuate the plurality of connection elements based at least in part on determining that the proximity of the second item holder is within a predetermined threshold to the first item holder.

12. A system comprising:
a station comprising a queue having a first row and a second row;
a management module operable to:
instruct a first mobile drive unit to move a first group of connected item holders from the second row to the first row;
instruct the first mobile drive unit to move the first group of connected item holders along the station such that one or more items stored by the first group of connected item holders are processed at the station;
after the one or more items from the first group of items are processed, instruct a second mobile drive unit to move a second group of connected item holders from the second row to the first row; and
wherein the first group of connected item holders comprises a first item holder that is connected to a second item holder and the second item holder is connected to a third item holder.

13. The system of claim 12, wherein the first mobile drive unit moves the first group of connected item holders by:
moving beneath the first item holder and raising a docking head against a surface of the first item holder; and moving while the docking head is against the surface of the first item holder.

14. A system comprising:
a station comprising a queue having a first row and a second row;
a management module operable to:
  instruct a first mobile drive unit to move a first group of connected item holders from the second row to the first row;
  instruct the first mobile drive unit to move the first group of connected item holders along the station such that one or more items stored by the first group of connected item holders are processed at the station;
  after the one or more items from the first group of items are processed, instruct a second mobile drive unit to move a second group of connected item holders from the second row to the first row; and
  wherein an item holder in the first group of item holders comprises:
at least one shelf configured to store items;
a plurality of legs configured to form a plurality of openings that allow a mobile drive unit to move beneath the item holder, wherein at least a portion of the legs are configured with at least one caster;
a plurality of faces, wherein at least two opposite faces each include at least one connection module comprising a plurality of actuatable connection elements and operable to connect to at least a portion of another item holder.

15. A method, comprising:
selecting, by a management module, a plurality of inventory holders that store inventory items to be processed at an inventory station;
selecting, from the plurality of inventory holders, a group of inventory holders to move to a queue to the inventory station, the group comprising at least a first inventory holder and a second inventory holder;
instructing, by the management module, a first mobile drive unit to move the first inventory holder to the queue;
instructing by the management module, a second mobile drive unit to move the second inventory holder to the queue;
instructing, by the management module, one or more of the first mobile drive unit and the second mobile drive unit to connect the second inventory holder to the first inventory holder by actuating a connection element that connects to a portion of the first inventory holder, thereby forming the group of inventory holders; and
instructing, by the management module, the first mobile drive unit to move the group of inventory holders through the queue to the inventory station, such that the inventory station processes one or more inventory items from the first inventory holder and the second inventory holder as the group moves through the queue.

16. The method of claim 15, further comprising:
in response to determining that the first inventory holder in the group has been disconnected from the group, selecting a third inventory holder from the plurality of inventory holders to be moved to the queue and connected to the group.

17. The method of claim 15, wherein the first mobile drive unit is operable to form the group to include at least five inventory holders arranged in a column.

18. The method of claim 17, wherein the first mobile drive unit coordinates with a third mobile drive unit to move the group through the queue, wherein the first mobile drive unit docks with the first inventory holder on a first end of the column and the third mobile drive unit docks with a fourth inventory holder on a second end of the column.

19. The method of claim 15, further comprising:
instructing the first mobile drive unit to disconnect the first inventory holder from the group after one or more inventory items are processed from the first inventory holder at the inventory station.

20. The method of claim 19, further comprising:
designating a plurality of mobile drive units for managing the queue, wherein the queue comprises a plurality of rows, wherein at least two rows each include a group of connected inventory holders.

* * * * *